(12) United States Patent
Huang

(10) Patent No.: US 10,761,703 B2
(45) Date of Patent: Sep. 1, 2020

(54) IMAGE DATA PROCESSING METHOD AND DEVICE

(71) Applicant: Tencent Technology (Shenzhen) Company Limited, Shenzhen (CN)

(72) Inventor: Kechao Huang, Shenzhen (CN)

(73) Assignee: TENCENT TECHNOLOGY (SHENZHEN) COMPANY LIMITED, Shenshen, Guangdong Province (CN)

(*) Notice: Subject to any disclaimer, the term of this patent is extended or adjusted under 35 U.S.C. 154(b) by 0 days.

(21) Appl. No.: 16/359,801

(22) Filed: Mar. 20, 2019

(65) Prior Publication Data
US 2019/0286307 A1    Sep. 19, 2019

Related U.S. Application Data

(63) Continuation of application No. PCT/CN2018/083471, filed on Apr. 18, 2018.

(30) Foreign Application Priority Data

Apr. 20, 2017 (CN) .......................... 2017 1 0262807

(51) Int. Cl.
*G06F 3/0484* (2013.01)
*G06F 3/0488* (2013.01)
*G06T 11/60* (2006.01)

(52) U.S. Cl.
CPC ........ *G06F 3/04845* (2013.01); *G06F 3/0488* (2013.01); *G06F 3/04883* (2013.01); *G06T 11/60* (2013.01); *G06F 2203/04803* (2013.01)

(58) Field of Classification Search
CPC ............. G06F 3/04845; G06F 3/04883; G06F 3/0488; G06F 2203/04803; G06T 11/60
See application file for complete search history.

(56) References Cited

U.S. PATENT DOCUMENTS 6,160,923 A  * 12/2000  Lawton ................. G06T 5/20
                                                            382/260
9,413,966 B2 *  8/2016  Chiu .................. H04N 5/23293
(Continued)

FOREIGN PATENT DOCUMENTS

CN    102566862 A    7/2012
CN    103106029 A    5/2013
(Continued)

OTHER PUBLICATIONS

Tencent Technology, WO, PCT/CN2018/083471, dated Jul. 19, 2018, 5 pgs.

(Continued)

*Primary Examiner* — William L Bashore
*Assistant Examiner* — Gregory A Distefano
(74) *Attorney, Agent, or Firm* — Morgan, Lewis & Bockius LLP

(57) ABSTRACT

Embodiments of the present disclosure disclose an image data processing method performed at a computing device, including: obtaining target image data, and creating grid information on a target display region corresponding to the target image data; obtaining a sliding operation track corresponding to a touch screen, and extracting a touch point in the sliding operation track, as a target touch point; creating position coordinates of the target touch point, and calculating, according to the grid information and the position coordinates of the target touch point, a cleaning number corresponding to the target touch point; adding a grid number same as the cleaning number to a preset number set, and deleting subimage data covered by the target touch point; and completely deleting, when the quantity of grid numbers in the number set meets a cleaning condition, the target image data from which a plurality of pieces of subimage data has been deleted.

20 Claims, 11 Drawing Sheets

(56) References Cited

U.S. PATENT DOCUMENTS

2007/0252821 A1 11/2007 Hollemans et al.
2014/0204125 A1* 7/2014 Smith ................... G06T 11/001
                                                              345/641
2015/0371049 A1* 12/2015 Xavier ................... G06T 11/00
                                                              726/26

FOREIGN PATENT DOCUMENTS

| CN | 103268628 A | 8/2013 |
| CN | 103959244 A | 7/2014 |
| CN | 104766361 A | 7/2015 |
| CN | 107145280 A | 9/2017 |

OTHER PUBLICATIONS

Tencent Technology, IPRP, PCT/CN2018/083471, dated Oct. 22, 2019, 6 pgs.
Tencent Technology, ISR, PCT/CN2018/083471, dated Jul. 19, 2018, 2 pgs.

* cited by examiner

Target image data 600 from which a plurality of pieces
of subimage data has been deleted

IMAGE DATA PROCESSING METHOD AND DEVICE

CROSS-REFERENCE TO RELATED APPLICATIONS

This application is a continuation application of PCT/CN2018/083471, entitled "IMAGE DATA PROCESSING METHOD AND DEVICE" filed on Apr. 18, 2018, which claims priority to Chinese Patent Application No. 201710262807.6, entitled "IMAGE DATA PROCESSING METHOD AND APPARATUS" filed with China National Intellectual Property Administration on Apr. 20, 2017, all of which are incorporated by reference in their entirety.

FIELD OF THE TECHNOLOGY

The present disclosure relates to the field of Internet technologies, and in particular, to an image data processing method and apparatus.

BACKGROUND OF THE DISCLOSURE

With the improvement of people's living standards, people get satisfaction in material life, and also gradually begin to pursue leisure life, and with the rapid development of the Internet and the popularization of smartphones, people like to share themselves or things around themselves, such as travel experiences and clothes matching, on the Internet in forms such as videos, pictures or files. Therefore, to cater to people's life requirements, various types of social software that can help people perform text, voice, or video communication with friends around anytime and anywhere are derived.

For example, currently, some audio and video live stream projects (such as makeup teaching live stream and clothes matching live stream) are increasingly growing on the Internet. Therefore, these live stream platforms may provide skin care and clothes matching skills for women who care about beauty. However, in many live stream projects, a host of a live stream room can only interact with viewers in superficial manners such as the viewer sending bullet screen information or giving gifts. As a result, a large quantity of viewers in this manner only act as a spectator, and cannot fully arouse interactions between the host and many viewers, and when more bullet screen information are given, text information sent by viewers has a relatively single display effect, and therefore, cannot necessarily be noticed by the host.

Therefore, to fulfill the screen display effect, and increase interactions between the host and the viewers, may be designed an interaction that allows viewers to spray a pigment to the host, that is, the host is required to erase the pigment sprayed by the viewers by simulating an eraser with fingers. A figure formed by finger during sliding is an irregular figure. If the area the ratio of the part is calculated according to an existing technical method, a current sprayed pigment figure needs to be segmented into approximately regular figure, and then a complex calculation formula is used to calculate the area of each section. The calculation is huge, and calculation results for irregular images have relatively large errors. Especially, when an irregular figure are relatively complex, for example, when the figures have overlaps, repeated calculations may be needed, so that the area ratio of the irregular figure cannot be accurately calculated, and therefore, the original interface cannot be restored to.

SUMMARY

Embodiments of the present disclosure provide an image data processing method and apparatus, to improve the calculation efficiency for an irregular figure, and reduce calculation errors for a cleaning proportion.

According to a first aspect, the present disclosure provides an image data processing method, including:

obtaining target image data, and creating grid information on a target display region corresponding to the target image data, the grid information including a plurality of subgrids, and each subgrid being corresponding to a different grid number;

obtaining a sliding operation track corresponding to a touch screen, and extracting a touch point that is in the sliding operation track and that is located on the target display region, as a target touch point;

creating position coordinates of the target touch point according to the grid information, and calculating, according to the grid information and the position coordinates of the target touch point, a cleaning number corresponding to the target touch point;

adding a grid number same as the cleaning number to a preset number set, and deleting subimage data covered by the target touch point; and completely deleting, when the quantity of grid numbers in the number set meets a preset cleaning condition, the target image data from which a plurality of pieces of subimage data has been deleted.

According to a second aspect, the present disclosure provides an image data processing apparatus, including:

a grid creation module, configured to obtain target image data, and create grid information on a target display region corresponding to the target image data, the grid information including a plurality of subgrids, and each subgrid being corresponding to a different grid number;

a track obtaining module, configured to obtain a sliding operation track corresponding to a touch screen, and extract a touch point that is in the sliding operation track and that is located on the target display region, as a target touch point;

a number calculation module, configured to create position coordinates of the target touch point according to the grid information, and calculate, according to the grid information and the position coordinates of the target touch point, a cleaning number corresponding to the target touch point;

an image deletion module, configured to add a grid number same as the cleaning number to a preset number set, and delete subimage data covered by the target touch point; and an interface display module, configured to completely delete, when the quantity of grid numbers in the number set meets a preset cleaning condition, the target image data from which a plurality of pieces of subimage data has been deleted.

According to a third aspect, the present disclosure further provides a computer readable storage medium, storing a program instruction, a processor performing any one of the foregoing methods when executing the stored program instruction.

In the embodiments of the present disclosure, target image data is obtained, and grid information is created on a target display region corresponding to the target image data, the grid information including a plurality of subgrids, and each subgrid corresponding to a different grid number; second, a sliding operation track corresponding to a touch screen is obtained, and a touch point that in the sliding operation track and that is located on the target display region is extracted as a target touch point; position coordinates of the target touch point are created according to the grid information, and a cleaning number corresponding to the target touch point is calculated according to the grid information and the position coordinates of the target touch point; further, a grid number same as the cleaning number is added to a preset number set, and subimage data covered by the target touch point is deleted; and finally, target image data from which a plurality of pieces of subimage data has been deleted is completely deleted when the quantity of grid numbers in the number set meets a preset cleaning condition. Therefore, as can be seen, when the subimage data covered by the target touch point is deleted, the area of an actually deleted figure does not need to be calculated in real time, and the target image data from which the plurality of pieces of subimage data has been deleted may only need to be completely deleted when the quantity of the grid numbers added to the number set meets the preset cleaning condition, thereby further improving the calculation efficiency for target image data corresponding to an irregular figure, and reducing calculation errors for a cleaning proportion.

BRIEF DESCRIPTION OF THE DRAWINGS

To more explicitly explain technical solutions in embodiments of the present disclosure, accompanying drawings needed in describing the embodiments are briefly introduced in the following. Apparently, the following accompanying drawings are only some embodiments of the present disclosure, and a person skilled in the art can derive other accompanying drawings from the accompanying drawings.

DESCRIPTION OF EMBODIMENTS

The following clearly and completely describes the technical solutions in the embodiments of the present disclosure with reference to the accompanying drawings in the embodiments of the present disclosure. Obviously, the described embodiments are only some embodiments instead of all embodiments of the present disclosure. All other embodiments obtained by a person of ordinary skill in the art based on the embodiments of the present disclosure without creative effects shall fall within the protection scope of the present disclosure.

Figure 1:
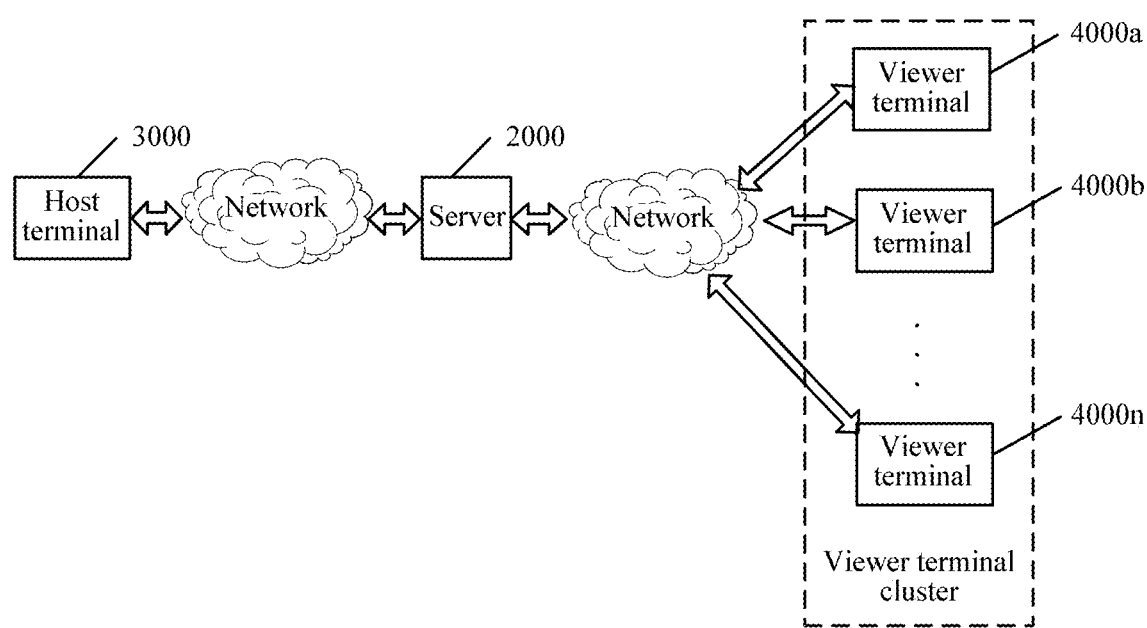
FIG. 1 is a schematic structural diagram of a network architecture according to an embodiment of the present disclosure.

Referring to FIG. 1, FIG. 1 is a schematic structural diagram of a network architecture according to an embodiment of the present disclosure. As shown in FIG. 1, the network architecture may include a host terminal 3000, a server 2000, and a viewer terminal cluster. The viewer terminal cluster may include a plurality of viewer terminals, and as shown in FIG. 1, specifically includes a viewer terminal 4000*a*, a viewer terminal 4000*b*, . . . , and a viewer terminal 4000*n*.

The viewer terminal 4000*a*, the viewer terminal 4000*b*, . . . , and the viewer terminal 4000*n* may be separately connected to the server 2000 through the Internet, and the server 2000 is connected to the host terminal 3000 through the Internet.

As shown in FIG. 1, the server 2000 may screen at least one viewer terminal in the viewer terminal cluster as a target viewer terminal (the target viewer terminal being the viewer terminal 4000*a* is used as an example), and deliver, to the viewer terminal 4000*a*, a target prop carrying a spraying permission, so that the viewer terminal 4000*a* displays the target prop on a prop selection interface according to the spraying permission. When the viewer terminal 4000*a* receives a selection operation executed by a user for the target prop, the viewer terminal 4000*a* uploads, to the server 2000 according to the selection operation, target image data corresponding to the target prop. The server 2000 forwards the target image data to the host terminal 3000. The host terminal 3000 displays the target image data, and uploads, to the server 2000, a picture display instruction carrying the target image data, so that the server 2000 notifies, according to the picture display instruction, other viewer terminals (such as the viewer terminal 4000*b*, . . . , and the viewer terminal 4000*n*) to synchronously display the target image data.

For example, in a live stream display interface on a live stream platform, four users (viewer terminals corresponding to the four users include a viewer terminal 4000*a*, a viewer terminal 4000*b*, a viewer terminal 4000*c*, and a viewer terminal 4000*d*) watch, online in the live stream platform, a makeup teaching video recorded by a hostess by using the host terminal 3000. In this case, if the server 2000 selects the viewer terminal 4000*b* as a terminal that may receive a target prop (for example, an Easter egg prop), so that the viewer terminal 4000*b* may obtain a spraying permission corresponding to the target prop. Then, in a live stream teaching process of the hostess, the viewer terminal 4000*b* may obtain the Easter egg prop by using the spraying permission, and spray a pigment to the hostess by using the Easter egg prop. That is, the viewer terminal 4000*b* sends, to the server 2000, target image data corresponding to the Easter egg prop, and then the server 2000 forwards the target image data to the host terminal 3000, so that the host terminal 3000 displays the target image data, to implement the effect of spraying the pigment to the hostess. Meanwhile, the server 2000 may further send the target image data to the viewer terminal 4000*a*, the viewer terminal 4000*c*, and the viewer terminal 4000*d*, so that the viewer terminal 4000*a*, the viewer terminal 4000*c*, and the viewer terminal 4000*d* may also display the target image data on the live stream interface. That is, the viewer terminal 4000*a*, the viewer terminal 4000*c*, and the viewer terminal 4000*d* may also display the effect of the hostess being sprayed by the pigment.

In addition, after the host terminal 3000 obtains the target image data, the host terminal 3000 may gradually delete the target image data according to a sliding operation of a host user for the display screen, until the target image data is completely deleted (that is, the effect that the host terminal 3000 erases the sprayed pigment may be implemented). In the process of deleting the target image data, the host terminal 3000 may upload deleted data to the server 2000 in real time, and then the server 2000 synchronizes the deleted data to the viewer terminals, so that the viewer terminals may synchronously delete the deleted data in the target image data. For example, if the host terminal 3000 erases a leaf in the target image data, the viewer terminals may also synchronously display the leaf being erased.

For the specific process in which the host terminal 3000 erases the target image data, reference may be made to the embodiments corresponding to the following FIG. 2 to FIG. 8.

Figure 2:
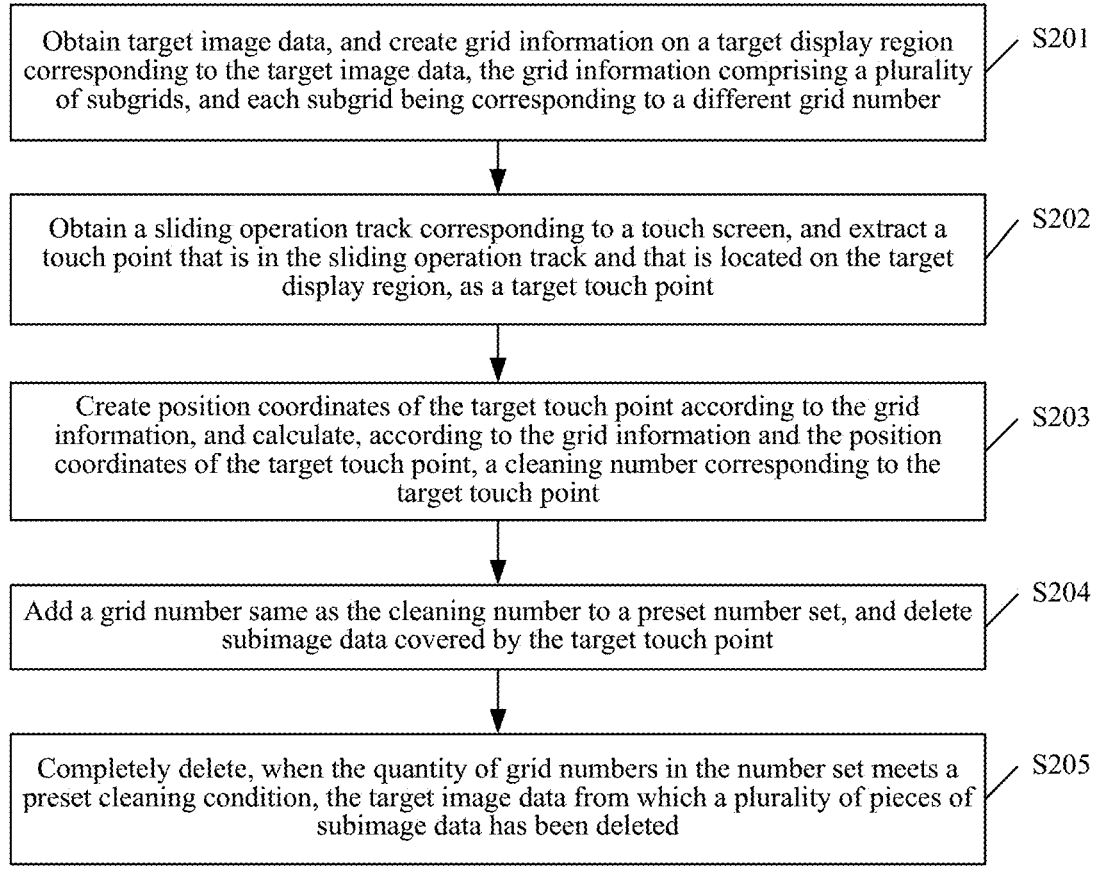
FIG. 2 is a schematic flowchart of an image data processing method according to an embodiment of the present disclosure.

Further, referring to FIG. 2, FIG. 2 is a schematic flowchart of an image data processing method according to an embodiment of the present disclosure. As shown in FIG. 2, the method may include:

S201. Obtain target image data, and create grid information on a target display region corresponding to the target image data.

Specifically, the host terminal obtains target image data, covers the target image data on an original display interface (the original display interface may be an interface displayed by the host terminal in the current live stream) for display, obtains a maximum length and a maximum width covered on the original display interface by the target image data, determines, based on the maximum length and the maximum width, a target display region corresponding to the target image data, creates an initial table in the target display region, determines each minimum unit rectangular box in the initial table as a subgrid, separately configures a corresponding grid number for each subgrid, and determines an initial table including the grid number as grid information. The host terminal may be the host terminal 3000 in the embodiment corresponding to the foregoing FIG. 1. For the process in which the host terminal obtains the target image data, reference may be made to the descriptions for the host terminal 3000, the server 2000, and the viewer terminal cluster in the embodiment corresponding to the foregoing FIG. 1, and details are not described herein again.

The host terminal includes a terminal device carrying a camera function, such as a personal computer, a tablet computer, a notebook computer, a smart TV, or a smartphone.

The grid information includes a plurality of subgrids, and each subgrid corresponds to a different grid number.

The target image data is located in the target display region.

The initial table completely overlaps the target display region, both a spacing between every two neighboring horizontal lines in the initial table and a spacing between every two neighboring vertical lines are a default touch point diameter, and both the length and the width of each subgrid are the default touch point diameter.

Figure 3:
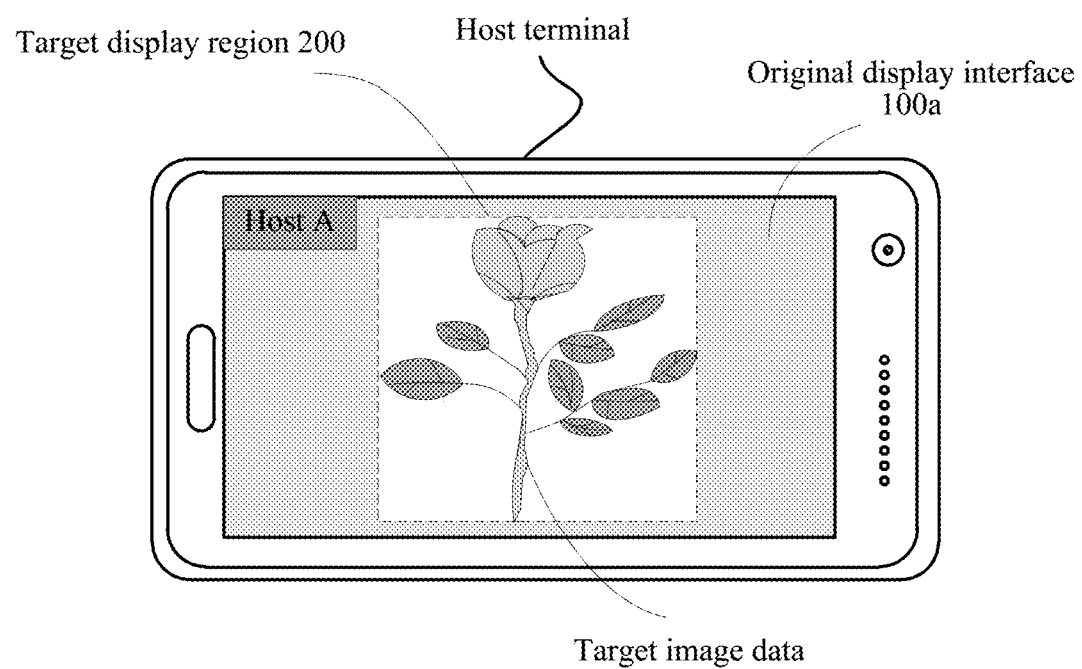
FIG. 3 is a schematic interface diagram of a current live stream interface of target image data according to an embodiment of the present disclosure.

For example, in a live stream display interface of a live stream platform, a viewer terminal sends target image data (for example, a flower with leaves) to a host terminal according to a spraying permission allocated by a server. Specifically, referring to FIG. 3 together, FIG. 3 is a schematic interface diagram of a current live stream interface of target image data according to an embodiment of the present disclosure. As shown in FIG. 3, the current live stream interface is an original display interface 100*a* corresponding to the host terminal, and the original display interface 100*a* is configured to display a live stream show recorded live on the live stream platform by a host. The viewer terminal selects, according to the obtained spraying permission, a prop corresponding to target image data in a prop page on the viewer terminal, and sends, to the host terminal by using the server, the target image data (that is, a flower with leaves shown in FIG. 3*a*) corresponding to the prop. The host terminal further covers the received target image data shown in FIG. 3 on the original display interface 100*a* for display, further obtains a maximum length L (for example, L=10 cm) and a maximum width W (for example, W=6 cm) covered on the original display interface 100*a* by the target image data, and further determines, based on the maximum length and the maximum width, a target display region 200 encircled by the target image data, as shown in FIG. 3. In addition, as shown in FIG. 3, the target image data is located in the target display region 200, the target display region 200 including the target image data is a region simulated to exist for the host terminal. For a host having the host terminal or a viewer watching live stream content on the host terminal, a rectangular box of the target display region 200 formed by dashed lines may be hidden and invisible.

Figure 4A:
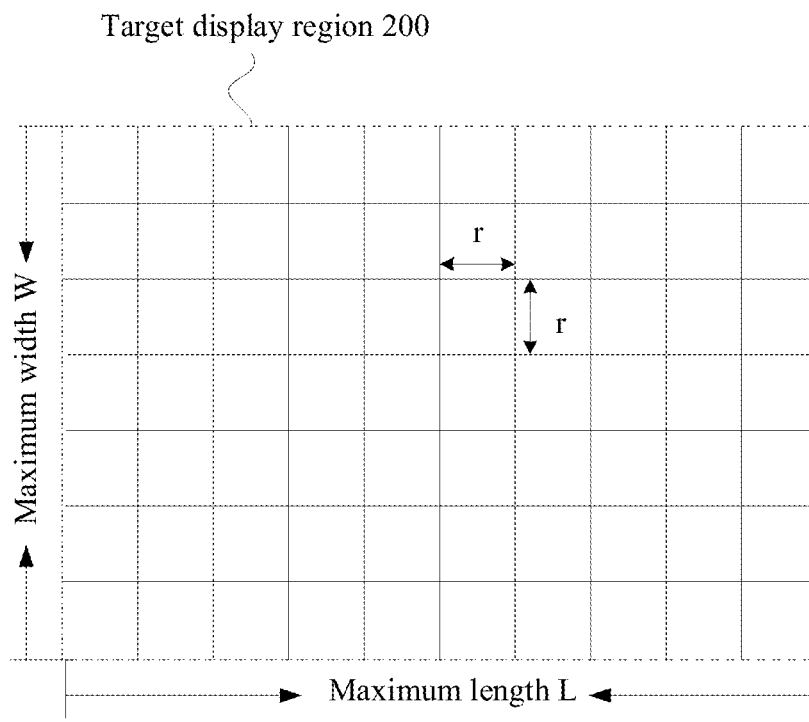
FIG. 4*a* and FIG. 4*b* are schematic diagrams of creating grid information in a target display region according to an embodiment of the present disclosure.
Figure 4B:
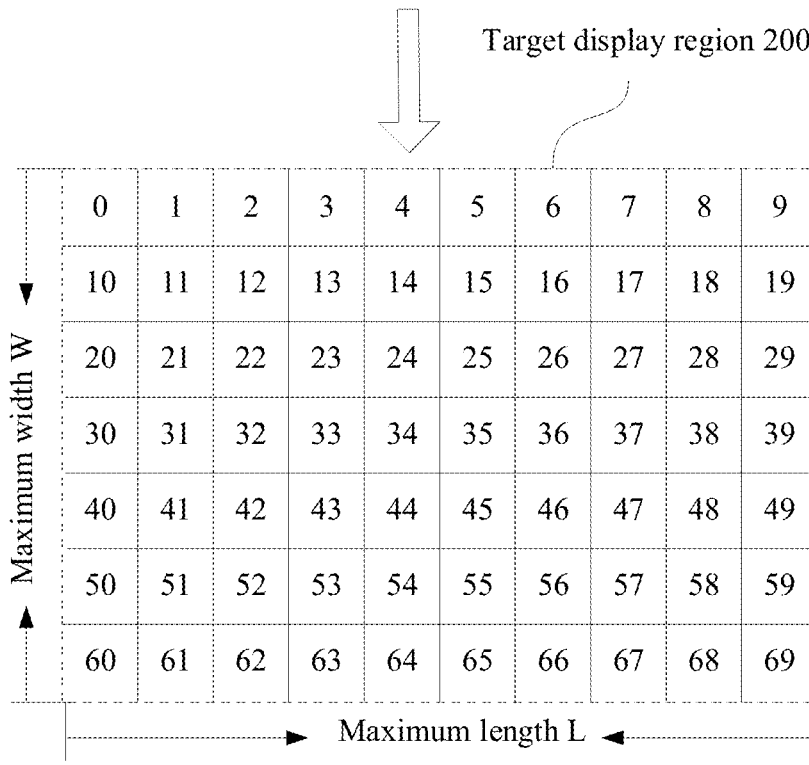

Further, referring to FIG. 4*a* and FIG. 4*b*, FIG. 4*a* and FIG. 4*b* are schematic diagrams of creating grid information in a target display region according to an embodiment of the present disclosure. As shown in FIG. 4*a*, the host terminal may first further create, according to the target display region 200 in the foregoing FIG. 3, a table formed by a plurality of subgrids that have an equal side length and that do not overlap each other, as an initial table (as shown in FIG. 4*a*) in the target display region 200. In the target display region 200 shown in FIG. 4*a*, the initial table completely overlap the target display region 200, and both a spacing between every two neighboring horizontal lines in the initial table and a spacing between every two neighboring vertical lines are a default touch point diameter (r), that is, both the length and the width of each subgrid in the initial table are a default touch point diameter (r). Then, the host terminal may further allocate grid numbers shown in FIG. 4*b* to the subgrids in the initial table separately. Finally, the host terminal may determine an initial table including a plurality of grid numbers as grid information created on the target display region.

S202. Obtain a sliding operation track corresponding to a touch screen, and extract a touch point that is in the sliding operation track and that is located on the target display region, as a target touch point.

Specifically, the host terminal may obtain a touch operation of a user for a touch screen in the target display region, obtain, according to the touch operation, a sliding operation track formed by at least one touch point, and further use the at least one touch point included in the sliding operation track as a target touch point.

The touch operation includes, but is not limited to, various operations of touching a touch-control screen, such as a pressing operation, a double-click operation, and a screen sliding operation. Usually, in a terminal device having a touch-control screen function, the structure of the touch-control screen includes at least three layers: a screen glass layer, a touch-control panel layer, and a display panel layer. The screen glass layer is a protection layer, the touch-control panel layer is used to sense a touch-control operation of a user, and the display panel layer is used to display an image.

For example, when the host uses fingers to slide up and down in a target display region in the host terminal, an irregular image formed during the sliding of the fingers is a sliding operation track corresponding to the touch screen in the host terminal. In the sliding operation track, at least one touch point (for example, two touch points extracted in the sliding operation track) located on the target display region may be further extracted according to a default touch point diameter r when the fingers touch the touch screen, and the two extracted touch points are used as target touch points.

S203. Create position coordinates of the target touch point according to the grid information, and calculate, according to the grid information and the position coordinates of the target touch point, a cleaning number corresponding to the target touch point.

Specifically, the host terminal creates a rectangular coordinate system in the grid information, calculates position coordinates of the target touch point according to the rectangular coordinate system, obtains a total quantity of columns in the grid information, and calculates, according to a preset grid number formula, the total quantity of columns, the default touch point diameter, and the position coordinates of the target touch point, the cleaning number corresponding to the target touch point.

A coordinate origin of the rectangular coordinate system created in the grid information may be the vertex at the upper left corner or the upper right corner of the grid information, a linear direction in which the maximum length of the grid information is located is a horizontal axis direction (that is, the x axis direction) of the rectangular coordinate system, and a linear direction in which the maximum width of the grid information is located is a vertical axis direction (that is, the y axis direction) of the rectangular coordinate system.

The total quantity of columns of the grid information is equal to the maximum length of grid information being divided by a side length (the default touch point diameter) of a single subgrid.

The total quantity of rows of the grid information is equal to the maximum width of grid information being divided by a side length (the default touch point diameter) of a single subgrid.

The cleaning number corresponding to the target touch point may be further calculated according to a preset grid number formula, the total quantity of columns, the default touch point diameter, and the position coordinates of the target touch point.

The preset grid number formula is $N=(\lfloor y/r \rfloor)*C+(\lfloor x/r \rfloor)$.

N is the cleaning number, x represents a horizontal coordinate value in the position coordinates, y represents a vertical coordinate value in the position coordinates, r is the default touch point diameter, and C represents the total quantity of columns in the grid information.

Figure 5:
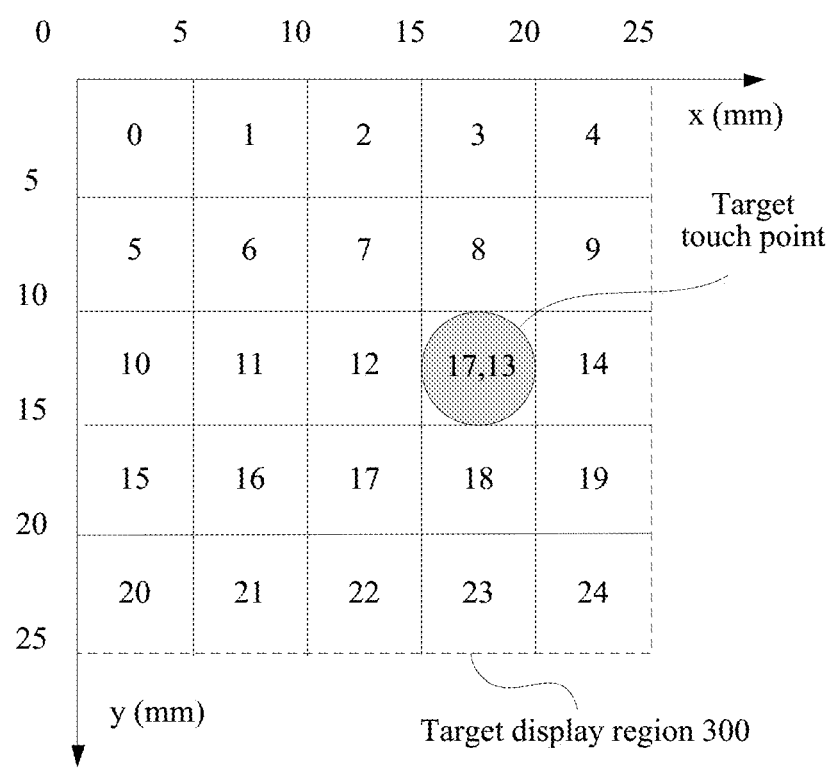
FIG. 5 is a schematic diagram of obtaining a cleaning number corresponding to a target touch point according to an embodiment of the present disclosure.

For example, further, referring to FIG. 5, FIG. 5 is a schematic diagram of obtaining a cleaning number corresponding to a target touch point according to an embodiment of the present disclosure. As shown in FIG. 5, in the target display region 300, the vertex at the upper left corner of the grid information may be used as a coordinate origin to create a rectangular coordinate system shown in FIG. 5. The grid information has a length L=25 mm and a width W=25 mm in the corresponding target display region 300 in the rectangular coordinate system. In addition, the host terminal obtains that the default touch point diameter of the target touch point in the sliding operation track is r=5 mm, that is, a side length of the single subgrid is equal to the default touch point diameter of the target touch point, or both the length and the width of the single subgrid are equal to the default touch point diameter of the target touch point. Therefore, in the rectangular coordinate system, the position coordinates of the target touch point may be further obtained. For example, the position coordinate may be (17, 13), that is, 17 is the horizontal coordinate value x of the target touch point in the rectangular coordinate system, and 13 is the vertical coordinate value y of the target touch point in the rectangular coordinate system. As shown in FIG. 5, the total quantity of columns of grid information in the target display region 300 is C=5, and the total quantity of rows is R=5. Therefore, the total quantity of columns C=5, the default touch point diameter r=5 mm, the vertical coordinate value y=13, and the horizontal coordinate value x=17 may be separately substituted into the grid number formula according to the preset grid number formula $N=(\lfloor y/r \rfloor)*C+(\lfloor x/r \rfloor)$, and it may be further obtained that the cleaning number corresponding to the target touch point is N=13.

S204. Add a grid number same as the cleaning number to a preset number set, and delete subimage data covered by the target touch point.

Specifically, the host terminal may detect whether a grid number same as the cleaning number exists in the preset number set, add the grid number same as the cleaning number to the number set if the grid number same as the cleaning number does not exist in the number set, and delete the subimage data covered by the target touch point, and skip adding the grid number same as the cleaning number to the number set if the grid number same as the cleaning number exists in the number set, and delete the subimage data covered by the target touch point.

Because when the fingers touch the touch screen, a default touch point diameter of a single target touch point is equal to the side length of the single subgrid, and the area covered by the single target touch point is equal to 78.5% of the area of the single subgrid. That is, the area proportion 78.5% corresponding to the single target touch point and the single subgrid may be used as a first area proportion. In view of this, when the fingers swipe the subimage data in the target image data, the subimage data covered by the target touch point may be erased.

For example, the host terminal detects that a first sliding operation track formed when fingers of a host slide on the touch screen carries five touch points (for example, the five touch points are separately a first touch point, a second touch point, a third touch point, a fourth touch point, and a fifth touch point), and position coordinates separately corresponding to the five touch points in the rectangular coordinate system are (14, 3), (9, 8), (12, 7), (16, 11), and (17, 13). Specifically, referring to Table 1, Table 1 is a statistical table of cleaning numbers separately corresponding to target touch points in a slide track.

TABLE 1

Sliding operation track

| | Target touch point | | | | |
|---|---|---|---|---|---|
| | First touch point | Second touch point | Third touch point | Fourth touch point | Fifth touch point |
| Position coordinates | (14, 3) | (9, 8) | (12, 7) | (16, 11) | (17, 13) |
| Cleaning number | 2 | 6 | 12 | 13 | 13 |

As can be known from the statistical table of cleaning numbers separately corresponding to target touch points in a slide track given in the foregoing Table 1, a cleaning number corresponding to a first touch point is 2, a cleaning number corresponding to a second touch point is 6, a cleaning number corresponding to a third touch point is 12, a cleaning number corresponding to a fourth touch point is 8, and a cleaning number corresponding to a fifth touch point is 13. In the process in which the fingers slide in the target display region, a grid number same as the cleaning number may be added to a preset number set (for example, a number set A). Therefore, a grid number 2 same as the cleaning number may be added to the number set A, a grid number 6 same as the cleaning number may be added to the number set A, a grid number 12 same as the cleaning number may be added to the number set A, and a grid number 13 same as the cleaning number may be added to the number set A. However, as can be known from the cleaning numbers separately corresponding to the touch points listed in the foregoing Table 1, the cleaning numbers of the fourth touch point and the fifth touch point are the same, and a cleaning number 13 (or a grid number 13 same as the cleaning number) corresponding to the fourth touch point has been added to the number set A. Therefore, the host terminal does not repeat to add the cleaning number corresponding to the fifth touch point. Therefore, the grid numbers in the number set A include: the grid number 2, the grid number 6, the grid number 12, and the grid number 13 same as the cleaning number. Therefore, as can be seen, as long as most areas of the target touch point fall within the subgrid whose grid number is 13, the calculated cleaning number corresponding to the target touch point is always 13. Therefore, although the host user performs many repeated sliding operations on the subgrid whose grid number is 13, the host terminal also always records the area of a touch point completely in a sub-network whose grid number is 13, to avoid repeatedly recording a same erased touch point.

Optionally, for the deletion of subimage data covered by target touch points carried in other sliding operation track, reference may be made to the erasing situation of the area region covered by the five target touch points in the target display region in the foregoing Table 1.

Step S205. Completely delete, when the quantity of grid numbers in the number set meets a preset cleaning condition, the target image data from which a plurality of pieces of subimage data has been deleted.

Meeting the cleaning condition means that when the host terminal obtains, through statistics collection by using a preset area cleaning formula, that an approximate cleaning area proportion P corresponding to the target image data is greater than or equal to a cleaning threshold (70%), it may be further regarded that the quantity of grid numbers in the number set meets the cleaning condition.

The preset area cleaning formula is: $P=(s*p/K)*100\%$.

s is the quantity of grid numbers stored to the number set, p is the ratio of the area of a touch point to the area of a subgrid, that is, the first area proportion, K is a total quantity of the subgrids, and the total quantity of the subgrids is equal to the product of the total quantity of rows and the total quantity of columns in the grid information.

For example, the number set A given in the foregoing Table 1 is still used as an example. When the quantity s of grid numbers added to the number set is 23, and the total quantity of the subgrids is 25, it may be further obtained, according to the foregoing area cleaning formula, that the approximate cleaning area P is roughly equal to 72%. In this case, P is greater than the cleaning threshold (70%) corresponding to the target image data. Therefore, the host terminal may further determine that the quantity of the grid numbers in the number set meets a preset cleaning condition, and further, the target image data from which the plurality of pieces of subimage data has been deleted may be completely deleted.

Optionally, because the target image data is covered on the original display interface for display, after the target image data from which the plurality of pieces of subimage data has been deleted is completely deleted, the original display interface needs to be further displayed.

It should be noted that, if an image of historical image data is originally covered on the original display interface, the target image data is covered on the historical image data for display. Therefore, after the target image data from which the plurality of pieces of subimage data has been deleted is completely deleted, the displayed original display interface is equivalent to the historical image data. The actual meaning is indicating that after the target image data has been completely deleted, the display of the original display interface is not affected, and what the original display interface is specifically is not limited.

In the embodiments of the present disclosure, first, target image data is obtained, and grid information is created on a target display region corresponding to the target image data, the grid information including a plurality of subgrids, and each subgrid corresponding to a different grid number; second, a sliding operation track corresponding to a touch screen is obtained, and a touch point that in the sliding operation track and that is located on the target display region is extracted as a target touch point; then, position coordinates of the target touch point are created according to the grid information, and a cleaning number corresponding to the target touch point is calculated according to the grid information and the position coordinates of the target touch point; then, a grid number same as the cleaning number is added to a preset number set, and subimage data covered by the target touch point is deleted; and finally, the target image data from which a plurality of pieces of subimage data has been deleted is completely deleted when the quantity of grid numbers in the number set meets a preset cleaning condition, and an original display interface is displayed. Therefore, as can be seen, when the subimage data covered by the target touch point is deleted, the area of an actually deleted figure does not need to be calculated in real time, and the target image data from which the plurality of pieces of subimage data has been deleted may only need to be completely deleted when the quantity of the grid numbers added to the number set meets the preset cleaning condition, to display the original interface, thereby further improving the calculation efficiency for target image data corresponding to an irregular figure, and reducing calculation errors for a cleaning proportion.

Figure 6:
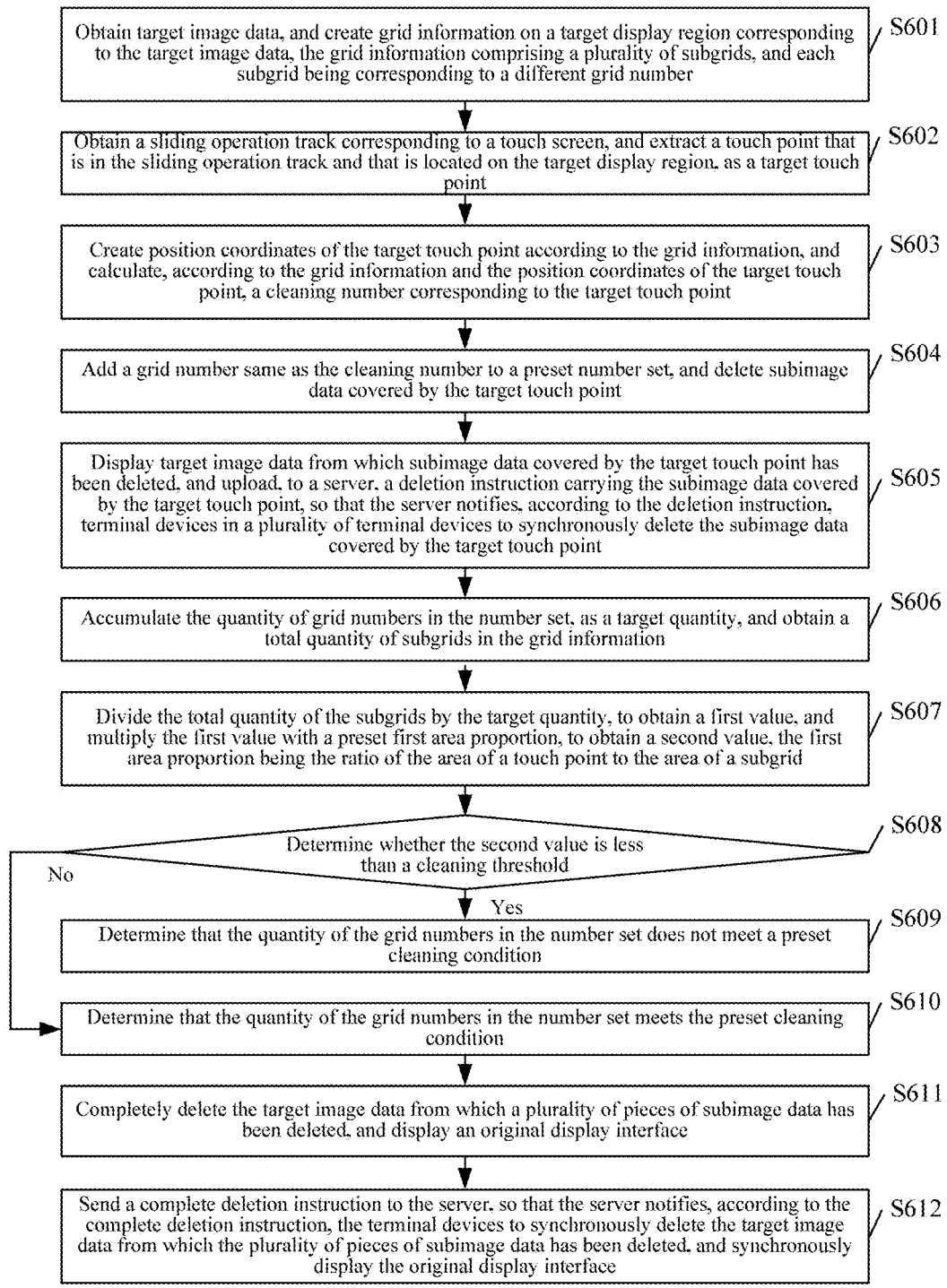
FIG. 6 is a schematic flowchart of another image data processing method according to an embodiment of the present disclosure.

Further, referring to FIG. 6, FIG. 6 is a schematic flowchart of another image data processing method according to an embodiment of the present disclosure. As shown in FIG. 6, the method may include:

S601. Obtain target image data, and create grid information on a target display region corresponding to the target image data.

Specifically, the host terminal obtains target image data, covers the target image data on the original display interface for display, obtains a maximum length and a maximum width covered on the original display interface by the target image data, determines, based on the maximum length and the maximum width, a target display region corresponding to the target image data, creates an initial table in the target display region, determines each minimum unit rectangular box in the initial table as a subgrid, separately configures a corresponding grid number for each subgrid, and determines an initial table including the grid number as grid information. The host terminal may be the host terminal 3000 in the embodiment corresponding to the foregoing FIG. 1. For the process in which the host terminal obtains the target image data, reference may be made to the descriptions for the host terminal 3000, the server 2000, and the viewer terminal cluster in the embodiment corresponding to the foregoing FIG. 1, and details are not described herein again.

The host terminal includes a terminal device carrying a camera function, such as a personal computer, a tablet computer, a notebook computer, a smart TV, or a smartphone.

The grid information includes a plurality of subgrids, and each subgrid corresponds to a different grid number.

The target image data is located in the target display region.

The initial table completely overlaps the target display region, both a spacing between every two neighboring horizontal lines in the initial table and a spacing between every two neighboring vertical lines are a default touch point diameter, and both the length and the width of each subgrid are the default touch point diameter.

Figure 7:
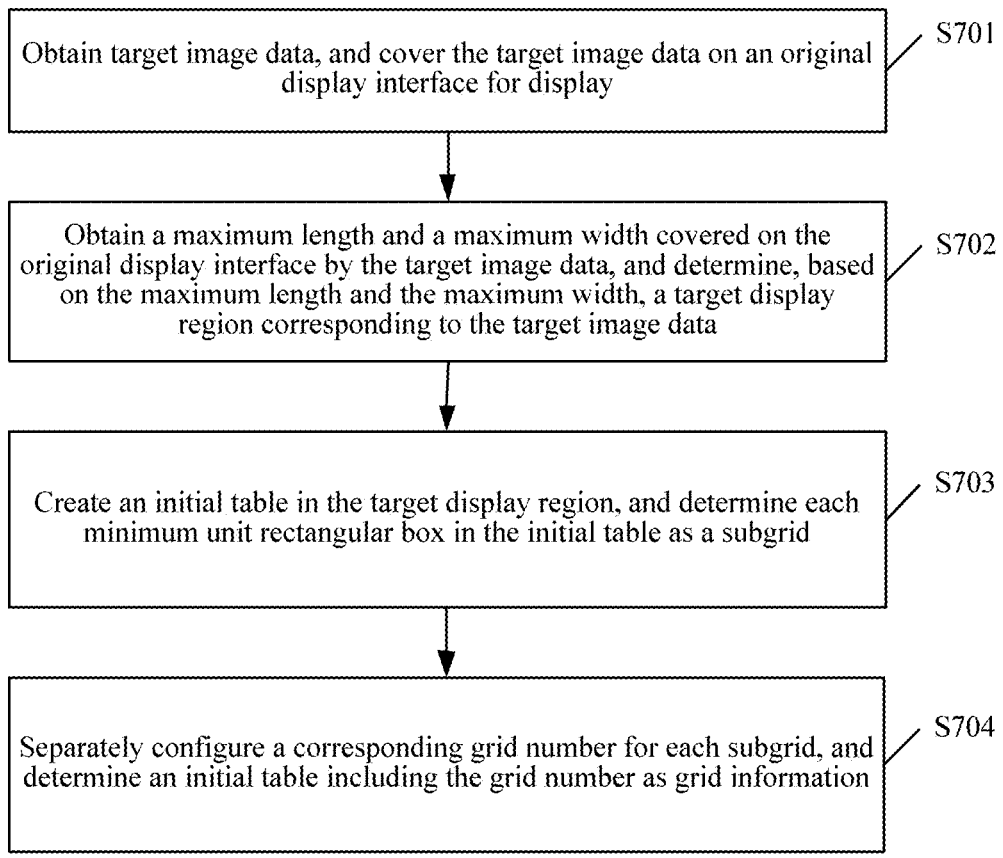
FIG. 7 is a schematic flowchart of creating grid information according to an embodiment of the present disclosure.

For the creation of the grid information, reference may be further made to FIG. 7, and FIG. 7 is a schematic flowchart of creating grid information according to an embodiment of the present disclosure. As shown in FIG. 7, step S701 to step 704 are a specific embodiment created based on the grid information corresponding to the foregoing step S601.

Step S701. Obtain target image data, and cover the target image data on an original display interface for display.

Step S702. Obtain a maximum length and a maximum width covered on the original display interface by the target image data, and determine, based on the maximum length and the maximum width, a target display region corresponding to the target image data.

The target image data is located in the target display region. For the specific implementations of step S701 and step 702, reference may be made to the descriptions for FIG. 3 in the embodiment corresponding to the foregoing FIG. 1, and details are not described herein again.

Step S703. Create an initial table in the target display region, and determine each minimum unit rectangular box in the initial table as a subgrid.

The initial table completely overlaps the target display region, both a spacing between every two neighboring horizontal lines in the initial table and a spacing between every two neighboring vertical lines are a default touch point diameter, and both the length and the width of each subgrid are the default touch point diameter.

Step S704. Separately configure a corresponding grid number for each subgrid, and determine an initial table including the grid number as grid information.

For the specific implementations of step S703 and step 704, reference may be made to the foregoing embodiment corresponding to FIG. 4*a* and FIG. 4*b*, and details are not described herein again.

S602. Obtain a sliding operation track corresponding to a touch screen, and extract a touch point that is in the sliding operation track and that is located on the target display region, as a target touch point.

Specifically, the host terminal may obtain a touch operation of a user for a touch screen in the target display region, obtain, according to the touch operation, a sliding operation track formed by at least one touch point, and further use the at least one touch point included in the sliding operation track as a target touch point.

The touch operation includes, but is not limited to, various operations of touching a touch-control screen, such as a pressing operation, a double-click operation, and a screen sliding operation. Usually, in a terminal device having a touch-control screen function, the structure of the touch-control screen includes at least three layers: a screen glass layer, a touch-control panel layer, and a display panel layer. The screen glass layer is a protection layer, the touch-control panel layer is used to sense a touch-control operation of a user, and the display panel layer is used to display an image.

S603. Create position coordinates of the target touch point according to the grid information, and calculate, according to the grid information and the position coordinates of the target touch point, a cleaning number corresponding to the target touch point.

Specifically, the host terminal creates a rectangular coordinate system in the grid information, calculates position coordinates of the target touch point according to the rectangular coordinate system, obtains a total quantity of columns in the grid information, and calculates, according to a preset grid number formula, the total quantity of columns, the default touch point diameter, and the position coordinates of the target touch point, the cleaning number corresponding to the target touch point.

A coordinate origin of the rectangular coordinate system created in the grid information may be the vertex at the upper left corner or the upper right corner of the grid information, a linear direction in which the maximum length of the grid information is located is a horizontal axis direction (that is, the x axis direction) of the rectangular coordinate system, and a linear direction in which the maximum width of the grid information is located is a vertical axis direction (that is, the y axis direction) of the rectangular coordinate system.

The total quantity of columns of the grid information is equal to the maximum length of grid information being divided by a side length (the default touch point diameter) of a single subgrid.

The total quantity of rows of the grid information is equal to the maximum width of grid information being divided by a side length (the default touch point diameter) of a single subgrid.

The cleaning number corresponding to the target touch point may be further calculated according to a preset grid number formula, the total quantity of columns, the default touch point diameter, and the position coordinates of the target touch point.

The preset grid number formula is $N=(\lfloor y/r \rfloor)*C+(\lfloor x/r \rfloor)$.

N is the cleaning number, x represents a horizontal coordinate value in the position coordinates, y represents a vertical coordinate value in the position coordinates, r is the default touch point diameter, and C represents the total quantity of columns in the grid information.

S604. Add a grid number same as the cleaning number to a preset number set, and delete subimage data covered by the target touch point.

Specifically, the host terminal may detect whether a grid number same as the cleaning number exists in the preset number set, add the grid number same as the cleaning number to the number set if the grid number same as the cleaning number does not exist in the number set, and delete the subimage data covered by the target touch point, and skip adding the grid number same as the cleaning number to the number set if the grid number same as the cleaning number exists in the number set, and delete the subimage data covered by the target touch point.

Because when the fingers touch the touch screen, a default touch point diameter of a single target touch point is equal to the side length of the single subgrid, and the area covered by the single target touch point is equal to 78.5% of the area of the single subgrid. That is, the area proportion 78.5% corresponding to the single target touch point and the single subgrid may be used as a first area proportion. In view of this, when the fingers swipe the subimage data in the target image data, the subimage data covered by the target touch point may be erased.

Step S605. Display target image data from which subimage data covered by the target touch point has been deleted, and upload, to a server, a deletion instruction carrying the subimage data covered by the target touch point, so that the server notifies, according to the deletion instruction, terminal devices in a plurality of terminal devices to synchronously delete the subimage data covered by the target touch point.

Specifically, the host terminal may display a sliding operation track corresponding to the target touch point, further delete subimage data covered by the sliding operation track, and display target image data from which subimage data covered by the target touch point carried in the sliding operation track has been deleted, and upload, to a server in a network connection relationship with the host terminal, a deletion instruction carrying the subimage data covered by the target touch point, so that the server notifies, by using another network connection relationship between terminal devices in a plurality of viewer terminals and according to the deletion instruction, the terminal devices to synchronously delete the subimage data covered by the target touch point.

Figure 8:
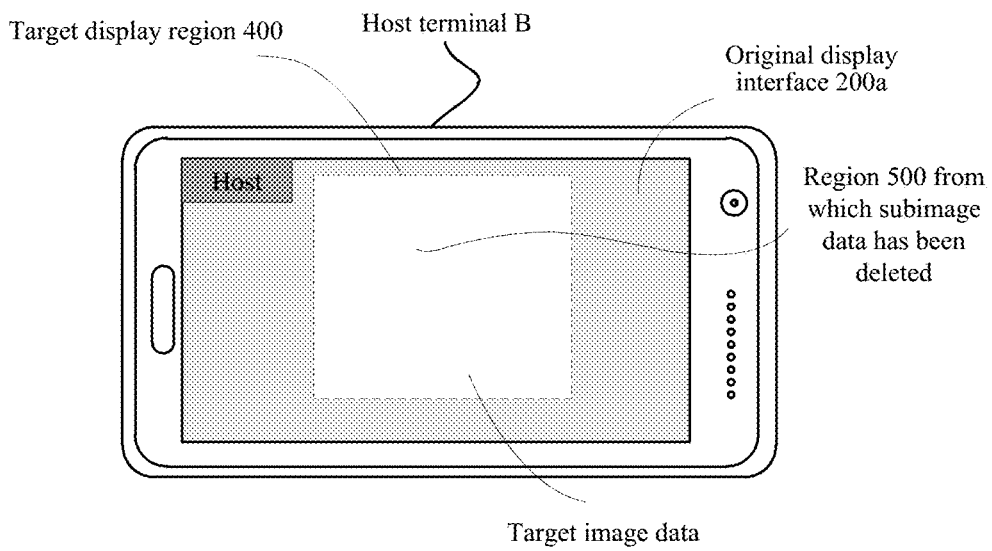
FIG. 8 is a schematic diagram of deleting subimage data covered by a target touch point according to an embodiment of the present disclosure.

Further, referring to FIG. 8 together, FIG. 8 is a schematic diagram of deleting subimage data covered by a target touch point according to an embodiment of the present disclosure. As shown in FIG. 8, when the host uses fingers to simulate an eraser to slide up and down in a target display region 400 of a host terminal B, an irregular image formed during the sliding of the fingers is a sliding operation track corresponding to the touch screen. The irregular sliding operation track is a region 500 from which subimage data has been deleted, formed when the host uses the fingers to simulate erasing the target image data. Because the default touch point diameter sensed by the touch screen is r=5 mm, when the fingers of the host touch the touch screen, a sliding operation track whose default touch point diameter is 5 mm shown in FIG. 8 may be formed, and target image data from which the subimage data covered by target touch points in the sliding operation track has been deleted may be further displayed in the host terminal B. In addition, the host terminal B may further upload, to the server according to a network connection relationship between the host terminal B and the server, a deletion instruction carrying the subimage data covered by the foregoing target touch points, so that the server notifies, according to the deletion instruction, viewer terminals in a plurality of viewer terminals to synchronously delete the subimage data covered by the target touch point.

Step S606. Accumulate the quantity of grid numbers in the number set, as a target quantity, and obtain a total quantity of subgrids in the grid information.

Step S607. Divide the total quantity of the subgrids by the target quantity, to obtain a first value, and multiply the first value with a preset first area proportion, to obtain a second value.

The first area proportion is the ratio of the area of a touch point to the area of a subgrid.

The second value may be obtained by using a preset area cleaning formula, that is, $P=(s*p/K)*100\%$.

P is a second value in the area cleaning formula, that is, an obtained approximate area cleaning proportion.

s is a target quantity in the number set in the area cleaning formula, that is, the quantity of grid numbers stored to the number set.

p is a first area proportion in the area cleaning formula, that is, the ratio of the area of a touch point to the area of a subgrid.

K is the total quantity of subgrids in the area cleaning formula, and the total quantity of subgrids is equal to the product of the total quantity of rows and the total quantity of columns in the grid information.

Optionally, to more accurately estimate the cleaning proportion corresponding to the target image data, the host terminal may further obtain a second area proportion between an image non-overlapping region and the target display region.

The image non-overlapping region is a non-overlapping region between an image region corresponding to the target image data and the target display region.

Further, the host terminal may divide the total quantity of the subgrids by the target quantity, to obtain a first value, and multiply the first value with a preset first area proportion and add the product to the second area proportion, to obtain a second value. In other words, in the target display region, a transparent region not overlapping the target image data is regarded as an erased part, and usually, an area proportion of the non-overlapping region between the image region corresponding to the target image data and the target display region is roughly 30%, that is, the second area proportion is 30%. Therefore, a new cleaning area formula is $P=(P1+q) =[(s*p/K)+q]*100\%$.

P is a second value in the area cleaning formula, that is, an obtained approximate area cleaning proportion.

s is a target quantity in the number set in the area cleaning formula, that is, the quantity of grid numbers stored to the number set.

p is a first area proportion in the area cleaning formula, that is, the ratio of the area of a touch point to the area of a subgrid.

K is the total quantity of subgrids in the area cleaning formula, and the total quantity of subgrids is equal to the product of the total quantity of rows and the total quantity of columns in the grid information.

q is a second area proportion in the area cleaning formula, that is, q=30%.

Step S608. Determine whether the second value is less than a cleaning threshold.

Specifically, after performing step S608, the host terminal may further perform step S609 when the second value is less than the cleaning threshold. Optionally, after performing step S608, the host terminal may further perform step S610 when the second value is greater than or equal to the cleaning threshold.

Step S609. Determine that the quantity of the grid numbers in the number set does not meet a preset cleaning condition, if determining that the second value is less than the cleaning threshold.

Specifically, if determining that the second value is less than the cleaning threshold, the host terminal may determine that the quantity of grid numbers in the number set does not meet the preset cleaning condition, may repeat to perform the foregoing steps S601 to step S608, and may perform step S610 until the second value is greater than or equal to the cleaning threshold.

Step S610. Determine that the quantity of the grid numbers in the number set meets the preset cleaning condition, if determining that the second value is greater than or equal to the cleaning threshold.

Specifically, if determining that the second value is greater than or equal to the cleaning threshold, the host terminal may determine that the quantity of grid numbers in the number set meets the cleaning condition, and may further perform step S611.

Step S611. Completely delete the target image data from which a plurality of pieces of subimage data has been deleted, and display an original display interface.

Specifically, the foregoing FIG. 8 is still used as an example. When the region 500 from which the subimage data has been deleted is deleted, the quantity of grid numbers added to the number set by the host terminal B accumulatively is 10. Because the total quantity of the subgrids is 70, as can be seen according to the foregoing formula P=(s*p/K)*100% or P=(P1+q)=[(s*p/K)+q]*100%, the second value P obtained through calculation may be 11% or 41%, but both the two second values are greater than or equal to the cleaning threshold (70%). Therefore, the host may continue to use the fingers to simulate an eraser to slide up and down in the target display region in the host terminal B, to simulate erasing of the target subimage data.

Figure 9A:
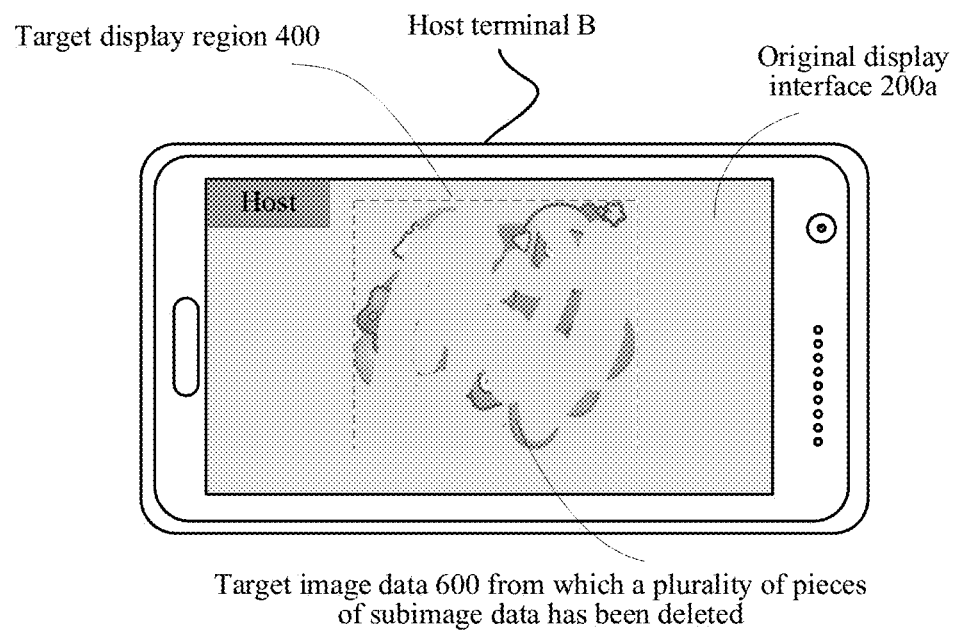
FIG. 9*a* and FIG. 9*b* are schematic diagrams of restoring to display an original display interface according to an embodiment of the present disclosure.
Figure 9B:
Figure 9B:
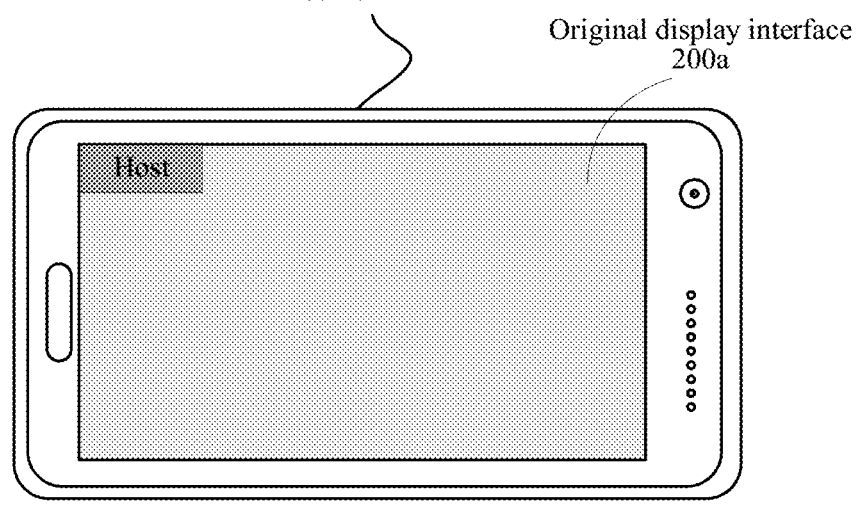

Further, referring to FIG. 9a and FIG. 9b together, FIG. 9a and FIG. 9b are schematic diagrams of restoring to display an original display interface according to an embodiment of the present disclosure. As shown in FIG. 9a, when the second value P is greater than or equal to the cleaning threshold 70%, the host terminal B may display target image data 600 from which a plurality of pieces of subimage data has been deleted, as shown in FIG. 9a. Compared with the sliding operation track in the foregoing FIG. 8, an irregular image displayed in FIG. 9a is a sliding operation track obtained by the host after performing many sliding operations on the touch screen. In this case, the quantity of the grid numbers in the number set meets the preset cleaning condition. Therefore, the host terminal B further performs step S611, that is, may further completely delete the target image data 600 from which a plurality of pieces of subimage data has been deleted, and display the original display interface 200a shown in FIG. 9b.

Step S612. Send a complete deletion instruction to the server, so that the server notifies, according to the complete deletion instruction, the terminal devices to synchronously delete the target image data from which the plurality of pieces of subimage data has been deleted, and synchronously display the original display interface.

In the embodiments of the present disclosure, first, target image data is obtained, and grid information is created on a target display region corresponding to the target image data, the grid information including a plurality of subgrids, and each subgrid corresponding to a different grid number; second, a sliding operation track corresponding to a touch screen is obtained, and a touch point that in the sliding operation track and that is located on the target display region is extracted as a target touch point; then, position coordinates of the target touch point are created according to the grid information, and a cleaning number corresponding to the target touch point is calculated according to the grid information and the position coordinates of the target touch point; then, a grid number same as the cleaning number are added to a preset number set, and subimage data covered by the target touch point is deleted; and finally, the target image data from which a plurality of pieces of subimage data has been deleted is completely deleted when the quantity of grid numbers in the number set meets a preset cleaning condition, and an original display interface is displayed. Therefore, as can be seen, when deleting the subimage data covered by the target touch point, the host terminal does not need calculate the area of an actually deleted figure in real time, but may only need completely delete, when the quantity of grid numbers added to the number set meets the preset cleaning condition, the target image data from which the plurality of pieces of subimage data has been deleted, to display the original interface. In addition, after displaying the original interface, the host terminal may further send a complete deletion instruction to a server, so that the server notifies, according to the complete deletion instruction, the terminal devices to synchronously delete the target image data from which the plurality of pieces of subimage data has been deleted, and synchronously display the original display interface, to further enrich interaction manners of a host and viewers, and improve the calculation efficiency for target image data corresponding to an irregular figure, thereby reducing calculation errors for a cleaning proportion.

Figure 10:
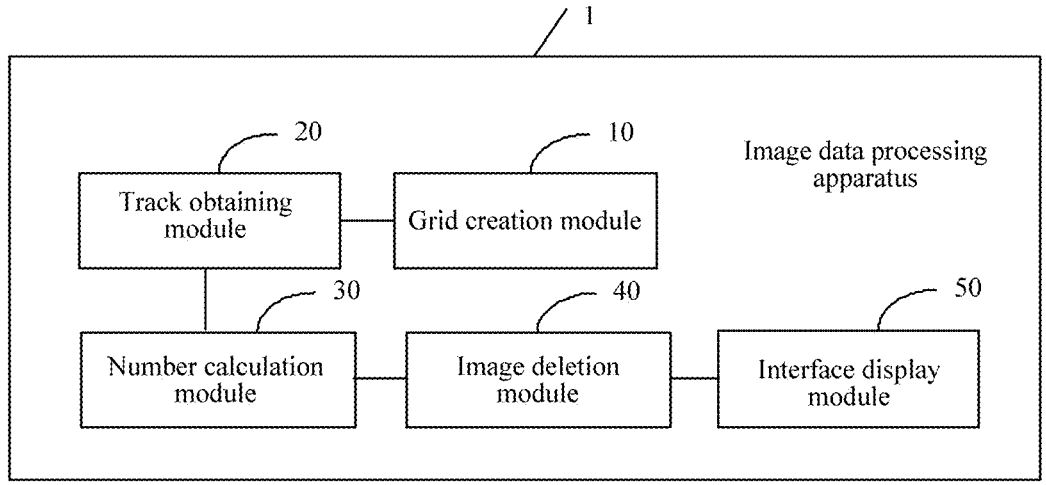
FIG. 10 is a schematic structural diagram of an image data processing apparatus according to an embodiment of the present disclosure.

Further, referring to FIG. 10, FIG. 10 is a schematic structural diagram of an image data processing apparatus according to an embodiment of the present disclosure. As shown in FIG. 10, the image data processing apparatus 1 may be applied to the host terminal in the embodiment corresponding to the foregoing FIG. 1. The image data processing apparatus 1 includes at least: a grid creation module 10, a track obtaining module 20, a number calculation module 30, an image deletion module 40, and an interface display module 50.

The grid creation module 10 is configured to obtain target image data, and create grid information on a target display region corresponding to the target image data.

Specifically, the image data processing apparatus 1 in the host terminal may be configured to obtain target image data, cover the target image data on the original display interface for display, obtain a maximum length and a maximum width covered on the original display interface by the target image data, determine, based on the maximum length and the maximum width, a target display region corresponding to the target image data, create an initial table in the target display region, determine each minimum unit rectangular box in the initial table as a subgrid, separately configure a corresponding grid number for each subgrid, and determine an initial table including the grid number as grid information.

The host terminal includes a terminal device carrying a camera function, such as a personal computer, a tablet computer, a notebook computer, a smart TV, or a smartphone.

The grid information includes a plurality of subgrids, and each subgrid corresponds to a different grid number.

The target image data is located in the target display region.

The initial table completely overlaps the target display region, both a spacing between every two neighboring horizontal lines in the initial table and a spacing between every two neighboring vertical lines are a default touch point diameter, and both the length and the width of each subgrid are the default touch point diameter.

Further, for the specific implementation of the grid creation module, reference may be made to the descriptions for FIG. 3 and FIG. 4 in the embodiment corresponding to the foregoing FIG. 2, and details are not described herein again.

The track obtaining module 20 is configured to obtain a sliding operation track corresponding to a touch screen, and extract a touch point that is in the sliding operation track and that is located on the target display region, as a target touch point.

Specifically, the track obtaining module 20 be may configured to obtain a touch operation of a user for a touch screen in the target display region, obtain, according to the touch operation, a sliding operation track formed by at least one touch point, and further use the at least one touch point included in the sliding operation track as a target touch point.

The touch operation includes, but is not limited to, various operations of touching a touch-control screen, such as a pressing operation, a double-click operation, and a screen sliding operation. Usually, in a terminal device having a touch-control screen function, the structure of the touch-control screen includes at least three layers: a screen glass layer, a touch-control panel layer, and a display panel layer. The screen glass layer is a protection layer, the touch-control panel layer is used to sense a touch-control operation of a user, and the display panel layer is used to display an image.

The number calculation module 30 is configured to create position coordinates of the target touch point according to the grid information, and calculate, according to the grid information and the position coordinates of the target touch point, a cleaning number corresponding to the target touch point.

Specifically, the number calculation module 30 may be configured to create a rectangular coordinate system in the grid information, calculate position coordinates of the target touch point according to the rectangular coordinate system, obtain a total quantity of columns in the grid information, and calculate, according to a preset grid number formula, the total quantity of columns, the default touch point diameter, and the position coordinates of the target touch point, the cleaning number corresponding to the target touch point.

A coordinate origin of the rectangular coordinate system created in the grid information may be the vertex at the upper left corner or the upper right corner of the grid information, a linear direction in which the maximum length of the grid information is located is a horizontal axis direction (that is, the x axis direction) of the rectangular coordinate system, and a linear direction in which the maximum width of the grid information is located is a vertical axis direction (that is, the y axis direction) of the rectangular coordinate system.

The total quantity of columns of the grid information is equal to the maximum length of grid information being divided by a side length (the default touch point diameter) of a single subgrid.

The total quantity of rows of the grid information is equal to the maximum width of grid information being divided by a side length (the default touch point diameter) of a single subgrid.

The cleaning number corresponding to the target touch point may be further calculated according to a preset grid number formula, the total quantity of columns, the default touch point diameter, and the position coordinates of the target touch point.

The preset grid number formula is $N=(\lfloor y/r \rfloor)*C+(\lfloor x/r \rfloor)$.

N is the cleaning number, x represents a horizontal coordinate value in the position coordinates, y represents a vertical coordinate value in the position coordinates, r is the default touch point diameter, and C represents the total quantity of columns in the grid information.

Further, for the specific implementation of the number calculation module 30, reference may be made to the descriptions for step S203 in the embodiment corresponding to the foregoing FIG. 2.

The image deletion module 40 is configured to add a grid number same as the cleaning number to a preset number set, and delete subimage data covered by the target touch point.

Specifically, the image deletion module 40 may be configured to detect whether a grid number same as the cleaning number exists in the preset number set, add the grid number same as the cleaning number to the number set if the grid number same as the cleaning number does not exist in the number set, and delete the subimage data covered by the target touch point, and skip adding the grid number same as the cleaning number to the number set if the grid number same as the cleaning number exists in the number set, and delete the subimage data covered by the target touch point.

Because when the fingers touch the touch screen, default touch point diameter of a single target touch point is equal to the side length of the single subgrid, and the area covered by the single target touch point is equal to 78.5% of the area of the single subgrid. That is, the area proportion 78.5% corresponding to the single target touch point and the single subgrid may be used as a first area proportion. In view of this, when the fingers swipe the subimage data in the target image data, the subimage data covered by the target touch point may be erased.

For the specific implementation of the image deletion module 40, reference may be made to the descriptions for the statistical situation of the cleaning numbers in Table 1 in the embodiment corresponding to the foregoing FIG. 2, and details are not described herein again.

The interface display module 50 is configured to completely delete, when the quantity of grid numbers in the number set meets a preset cleaning condition, the target image data from which a plurality of pieces of subimage data has been deleted.

Meeting the cleaning condition means that when the interface display module 50 obtains, through statistics collection by using a preset area cleaning formula, that an approximate cleaning area proportion P corresponding to the target image data is greater than or equal to a cleaning threshold (70%), it may be further regarded that the quantity of grid numbers in the number set meets the cleaning condition.

The preset area cleaning formula is $P=(s*p/K)*100\%$.

s is the quantity of grid numbers stored to the number set, p is the ratio of the area of a touch point to the area of a subgrid, that is, the first area proportion, K is a total quantity of the subgrids, and the total quantity of the subgrids is equal to the product of the total quantity of rows and the total quantity of columns in the grid information.

Optionally, when data of the grid numbers added to the number set does not meet the preset cleaning condition, the image data processing apparatus 1 may further perform the foregoing step S202 to step S204.

For example, the number set A given in the foregoing Table 1 is still used as an example. When the quantity s of grid numbers added to the number set is 5, and the total quantity of the subgrids is 25, it may be further obtained, according to the foregoing area cleaning formula, that the approximate cleaning area P is roughly equal to 15.7%. In this case, P is greater than the cleaning threshold (70%) corresponding to the target image data. Therefore, the host terminal may further notify the track obtaining module 20 to obtain the sliding operation track corresponding to the touch screen.

In the embodiments of the present disclosure, the data image processing apparatus 1 first obtains target image data, and creates grid information on a target display region corresponding to the target image data, the grid information including a plurality of subgrids, and each subgrid corresponding to a different grid number; second, obtains a sliding operation track corresponding to a touch screen, and extracts a touch point that in the sliding operation track and that is located on the target display region as a target touch point; then, creates position coordinates of the target touch point according to the grid information, and calculates, according to the grid information and the position coordinates of the target touch point, a cleaning number corresponding to the target touch point; then, adds a grid number same as the cleaning number to a preset number set, and deletes subimage data covered by the target touch point; and finally, completely deletes, when the quantity of grid numbers in the number set meets a preset cleaning condition, the target image data from which a plurality of pieces of subimage data has been deleted. Therefore, as can be seen, when the subimage data covered by the target touch point is deleted, the area of an actually deleted figure does not need to be calculated in real time, and the target image data from which the plurality of pieces of subimage data has been deleted may only need to be completely deleted when the quantity of the grid numbers added to the number set meets the preset cleaning condition, thereby further improving the calculation efficiency for target image data corresponding to an irregular figure, and reducing calculation errors for a cleaning proportion.

Figure 11:
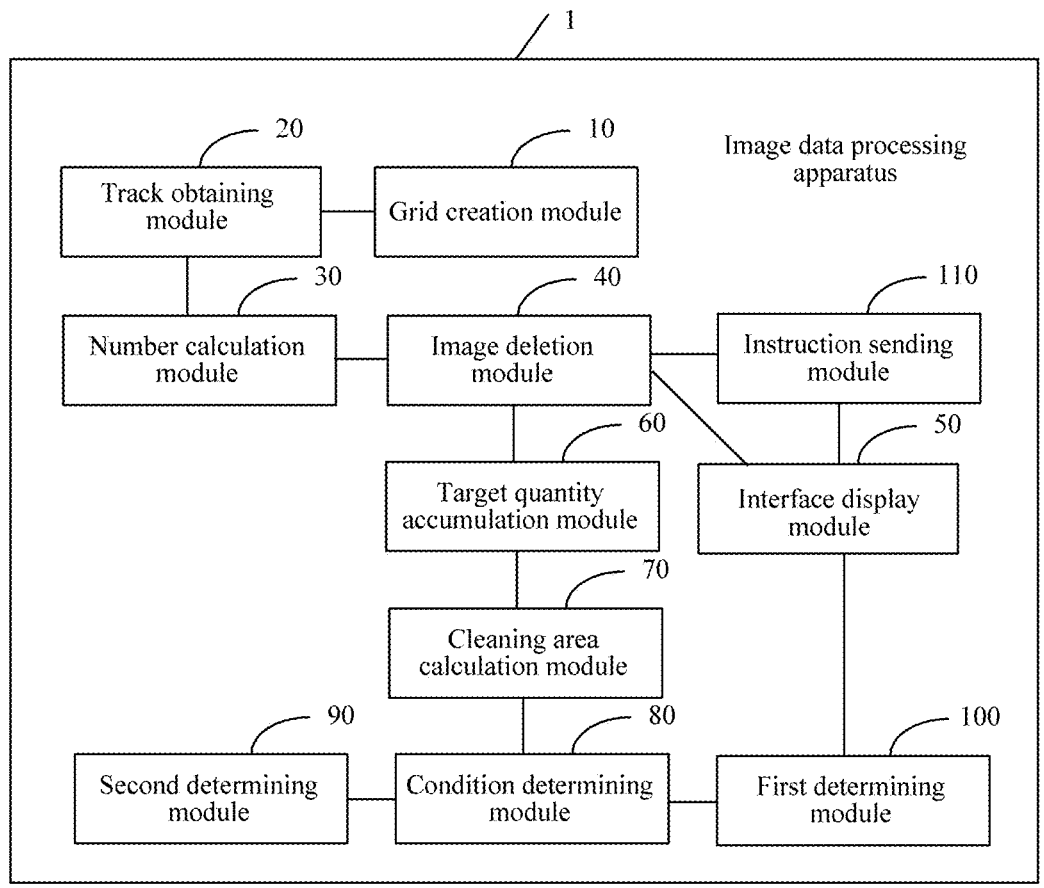
FIG. 11 is a schematic structural diagram of another image data processing apparatus according to an embodiment of the present disclosure.

Further, referring to FIG. 11, FIG. 11 is a schematic structural diagram of another image data processing apparatus according to an embodiment of the present disclosure. As shown in FIG. 11, the image data processing apparatus 1 may include the grid creation module 10, the track obtaining module 20, the number calculation module 30, the image deletion module 40, and the interface display module 50 in the embodiment corresponding to the foregoing FIG. 10. Further, the image data processing apparatus 1 may further include: a target quantity accumulation module 60, a cleaning area calculation module 70, a condition determining module 80, a second determining module 90, a first determining module 100, and an instruction sending module 110.

Figure 12:
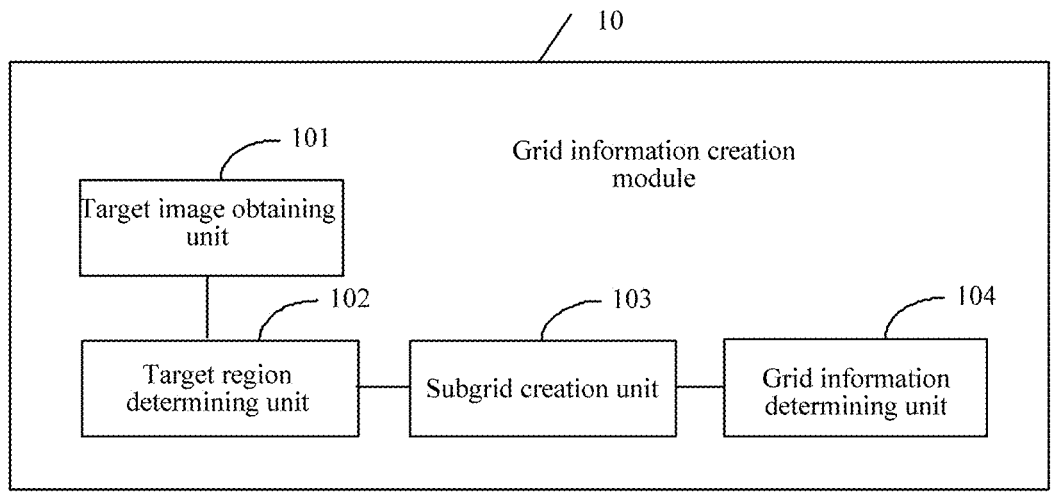
FIG. 12 is a schematic structural diagram of a grid creation module according to an embodiment of the present disclosure.

Further, referring to FIG. 12, FIG. 12 is a schematic structural diagram of a grid creation module according to an embodiment of the disclosure. As shown in FIG. 12, the grid information creation module 10 includes: a target image obtaining unit 101, a target region determining unit 102, a subgrid creation unit 103, and a grid information determining unit 104.

The target image obtaining unit 101 is configured to obtain target image data, and cover the target image data on an original display interface for display.

The target region determining unit 102 is configured to obtain a maximum length and a maximum width covered on the original display interface by the target image data, and determine, based on the maximum length and the maximum width, a target display region corresponding to the target image data, the target image data being located in the target display region.

The subgrid creation unit 103 is configured to create an initial table in the target display region, and determine each minimum unit rectangular box in the initial table as a subgrid, the initial table completely overlapping the target display region, both a spacing between every two neighboring horizontal lines in the initial table and a spacing between every two neighboring vertical lines being a default touch point diameter, and both the length and the width of each subgrid being the default touch point diameter.

The grid information determining unit 104 is configured to separately configure a corresponding grid number for each subgrid, and determine an initial table including the grid number as grid information.

The grid information includes a plurality of subgrids, and each subgrid corresponds to a different grid number.

The target image data is located in the target display region.

The initial table completely overlaps the target display region, both a spacing between every two neighboring horizontal lines in the initial table and a spacing between every two neighboring vertical lines are a default touch point diameter, and both the length and the width of each subgrid are the default touch point diameter.

For the specific implementation of the grid creation module 10, reference may be made to the descriptions for step S201 in the embodiment corresponding to the foregoing FIG. 2, and details are not described herein again.

Further, the interface display module 50 is further configured to display the original display interface after the target image data from which the plurality of pieces of subimage data has been deleted is completely deleted.

Figure 13:
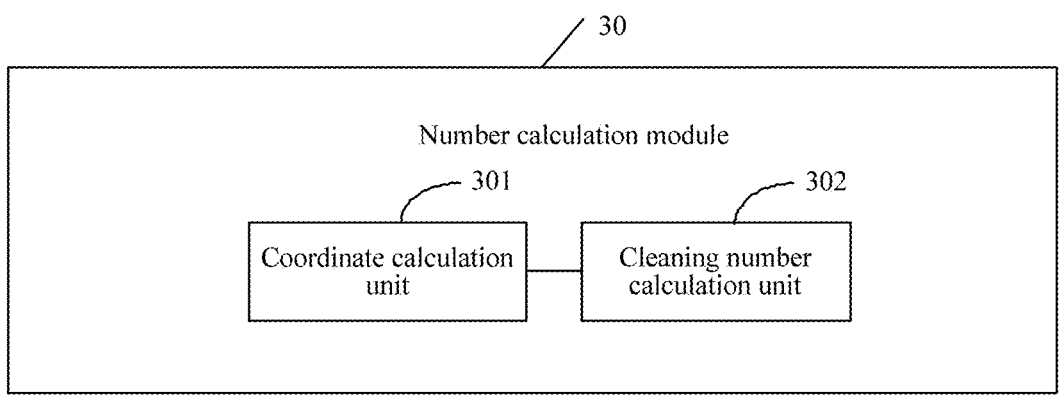
FIG. 13 is a schematic structural diagram of a number calculation module according to an embodiment of the present disclosure.

Further, referring to FIG. 13, FIG. 13 is a schematic structural diagram of a number calculation module according to an embodiment of the present disclosure. As shown in FIG. 13, the number calculation module 30 includes: a coordinate calculation unit 301 and a cleaning number calculation unit 302.

The coordinate calculation unit 301 is configured to create a rectangular coordinate system in the grid information, and calculate position coordinates of the target touch point according to the rectangular coordinate system.

The cleaning number calculation unit 302 is configured to obtain a total quantity of columns in the grid information, and calculate the cleaning number corresponding to the target touch point according to a preset grid number formula, the total quantity of columns, the default touch point diameter, and the position coordinates of the target touch point.

A coordinate origin of the rectangular coordinate system created in the grid information may be the vertex at the upper left corner or the upper right corner of the grid information, a linear direction in which the maximum length of the grid information is located is a horizontal axis direction (that is, the x axis direction) of the rectangular coordinate system, and a linear direction in which the maximum width of the grid information is located is a vertical axis direction (that is, the y axis direction) of the rectangular coordinate system.

The total quantity of columns of the grid information is equal to the maximum length of grid information being divided by a side length (the default touch point diameter) of a single subgrid.

The total quantity of rows of the grid information is equal to the maximum width of grid information being divided by a side length (the default touch point diameter) of a single subgrid.

The cleaning number corresponding to the target touch point may be further calculated according to a preset grid number formula, the total quantity of columns, the default touch point diameter, and the position coordinates of the target touch point.

The preset grid number formula is $N=(\lfloor y/r \rfloor)*C+(\lfloor x/r \rfloor)$.

N is the cleaning number, x represents a horizontal coordinate value in the position coordinates, y represents a vertical coordinate value in the position coordinates, r is the default touch point diameter, and C represents the total quantity of columns in the grid information.

For the specific implementation of the number calculation module 30, reference may be made to the descriptions for step S203 in the embodiment corresponding to the foregoing FIG. 2, and details are not described herein again.

Figure 14:
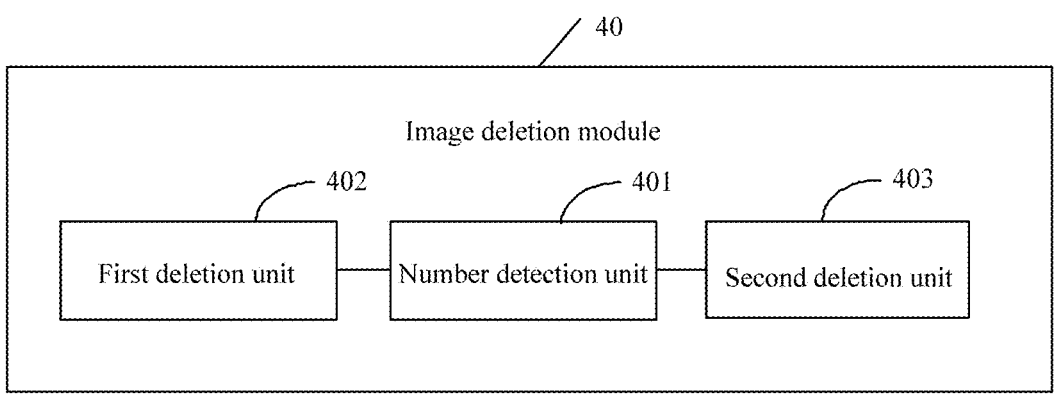
FIG. 14 is a schematic structural diagram of an image deletion module according to an embodiment of the present disclosure.

Further, referring to FIG. 14, FIG. 14 is a schematic structural diagram of an image deletion module according to an embodiment of the present disclosure. As shown in FIG. 14, the image deletion module 40 includes: a number detection unit 401, a first deletion unit 402, and a second deletion unit 403.

The number detection unit 401 is configured to detect whether a grid number same as the cleaning number exists in the preset number set.

The first deletion unit 402 is configured to add the grid number same as the cleaning number to the number set if the grid number same as the cleaning number does not exist in the number set, and delete the subimage data covered by the target touch point.

The second deletion unit 403 is configured to skip adding the grid number same as the cleaning number to the number set if the grid number same as the cleaning number does not exist in the number set, and delete the subimage data covered by the target touch point.

Further, for the specific implementation of the image deletion module 40, reference may be made to the descriptions for step S204 in the embodiment corresponding to the foregoing FIG. 2, and details are not described herein again.

The target quantity accumulation module 60 is configured to accumulate the quantity of grid numbers in the number set, as a target quantity, and obtain a total quantity of subgrids in the grid information.

The cleaning area calculation module 70 is configured to divide the total quantity of the subgrids by the target quantity, to obtain a first value, and multiplying the first value with a preset first area proportion, to obtain a second value, the first area proportion being the ratio of the area of a touch point to the area of a subgrid.

The condition determining module 80 is configured to determine whether the second value is less than a cleaning threshold.

The first determining module 100 is configured to determine that the quantity of the grid numbers in the number set meets the preset cleaning condition, if it is determined that the second value is greater than or equal to the cleaning threshold.

The second determining module 90 is configured to determine that the quantity of the grid numbers in the number set does not meet the preset cleaning condition, if it is determined that the second value is less than the cleaning threshold.

The total quantity of the subgrids is the product of a total quantity of rows and a total quantity of columns in the grid information.

Figure 15:
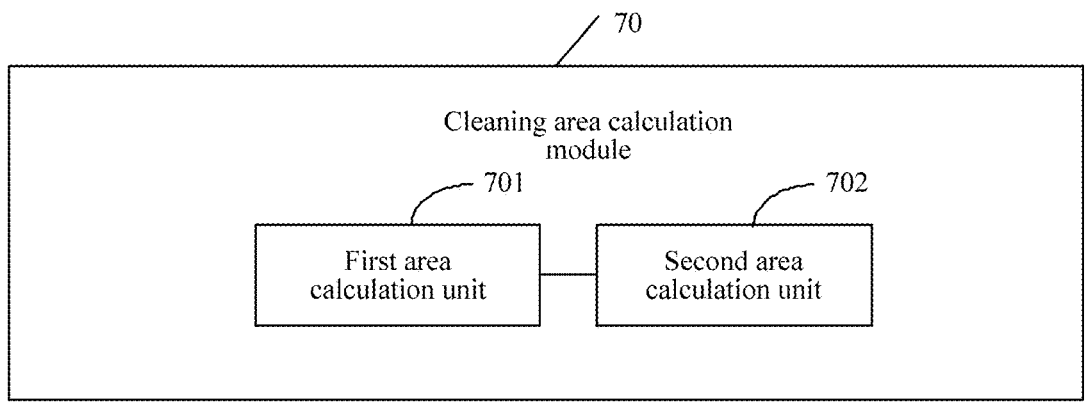
FIG. 15 is a schematic structural diagram of a cleaning area calculation module according to an embodiment of the present disclosure.

Further, referring to FIG. 15, FIG. 15 is a schematic structural diagram of a cleaning area calculation module according to an embodiment of the present disclosure. As shown in FIG. 15, the cleaning area calculation module 70 includes: a first area calculation unit 701 and a second area calculation unit 702.

The first area calculation unit 701 is configured to obtain a second area proportion between an image non-overlapping region and the target display region, the image non-overlapping region being a non-overlapping region between an image region corresponding to the target image data and the target display region.

The second area calculation unit 702 is configured to divide the total quantity of the subgrids by the target quantity, to obtain a first value, and multiply the first value with the preset first area proportion and add the product to the second area proportion, to obtain a second value.

The first area proportion is the ratio of the area of a touch point to the area of a subgrid.

The second value may be obtained by using a preset area cleaning formula, that is, $P=(s*p/K)*100\%$.

P is a second value in the area cleaning formula, that is, an obtained approximate area cleaning proportion.

s is a target quantity in the number set in the area cleaning formula, that is, the quantity of grid numbers stored to the number set.

p is a first area proportion in the area cleaning formula, that is, the ratio of the area of a touch point to the area of a subgrid.

K is the total quantity of subgrids in the area cleaning formula, and the total quantity of subgrids is equal to the product of the total quantity of rows and the total quantity of columns in the grid information.

Optionally, to more accurately estimate the cleaning proportion corresponding to the target image data, the host terminal may further obtain a second area proportion between an image non-overlapping region and the target display region.

The image non-overlapping region is a non-overlapping region between an image region corresponding to the target image data and the target display region.

Further, the image data processing apparatus 1 may divide the total quantity of the subgrids by the target quantity, to obtain a first value, and multiply the first value with a preset first area proportion and add the product to the second area proportion, to obtain a second value. In other words, in the target display region, a transparent region not overlapping the target image data is regarded as an erased part, and usually, an area proportion of the non-overlapping region between the image region corresponding to the target image data and the target display region is roughly 30%, that is, the second area proportion is 30%. Therefore, a new cleaning area formula is $P=(P1+q)=[(s*p/K)+q]*100\%$.

P is a second value in the area cleaning formula, that is, an obtained approximate area cleaning proportion.

s is a target quantity in the number set in the area cleaning formula, that is, the quantity of grid numbers stored to the number set.

p is a first area proportion in the area cleaning formula, that is, the ratio of the area of a touch point to the area of a subgrid.

K is the total quantity of subgrids in the area cleaning formula, and the total quantity of subgrids is equal to the product of the total quantity of rows and the total quantity of columns in the grid information.

q is a second area proportion in the area cleaning formula, that is, q=30%.

The instruction sending module 100 is configured to display target image data from which subimage data covered by the target touch point has been deleted, and upload, to a server, a deletion instruction carrying the subimage data covered by the target touch point, so that the server notifies, according to the deletion instruction, terminal devices in a plurality of terminal devices to synchronously delete the subimage data.

Optionally, the instruction sending module is further configured to send a complete deletion instruction to the server, so that the server notifies, according to the complete deletion instruction, the terminal devices to synchronously delete the target image data from which the plurality of pieces of subimage data has been deleted, and synchronously display the original display interface.

Specifically, for the specific implementation of the instruction sending module 110, reference may be made to the descriptions for the network architecture in the embodiment corresponding to the foregoing FIG. 1, and details are not described herein again.

In the embodiments of the present disclosure, the data image processing apparatus 1 first obtains target image data, and creates grid information on a target display region corresponding to the target image data, the grid information including a plurality of subgrids, and each subgrid corresponding to a different grid number; second, obtains a sliding operation track corresponding to a touch screen, and extracts a touch point that in the sliding operation track and that is located on the target display region as a target touch point; then, creates position coordinates of the target touch point according to the grid information, and calculates, according to the grid information and the position coordinates of the target touch point, a cleaning number corresponding to the target touch point; then, adds a grid number same as the cleaning number to a preset number set, and deletes subimage data covered by the target touch point; and finally, completely deletes, when the quantity of grid numbers in the number set meets a preset cleaning condition, the target image data from which a plurality of pieces of subimage data has been deleted, and displays an original display interface. Therefore, as can be seen, when the subimage data covered by the target touch point is deleted, the area of an actually deleted figure does not need to be calculated in real time, and the target image data from which the plurality of pieces of subimage data has been deleted may only need to be completely deleted when the quantity of the grid numbers added to the number set meets the preset cleaning condition, to display the original interface. In addition, after the original interface is displayed, a complete deletion instruction may be further sent to a server, so that the server notifies, according to the complete deletion instruction, the terminal devices to synchronously delete the target image data from which the plurality of pieces of subimage data has been deleted, and synchronously display the original display interface, to further enrich interaction manners of a host and viewers, and improve the calculation efficiency for target image data corresponding to an irregular figure, thereby reducing calculation errors for a cleaning proportion.

Figure 16:
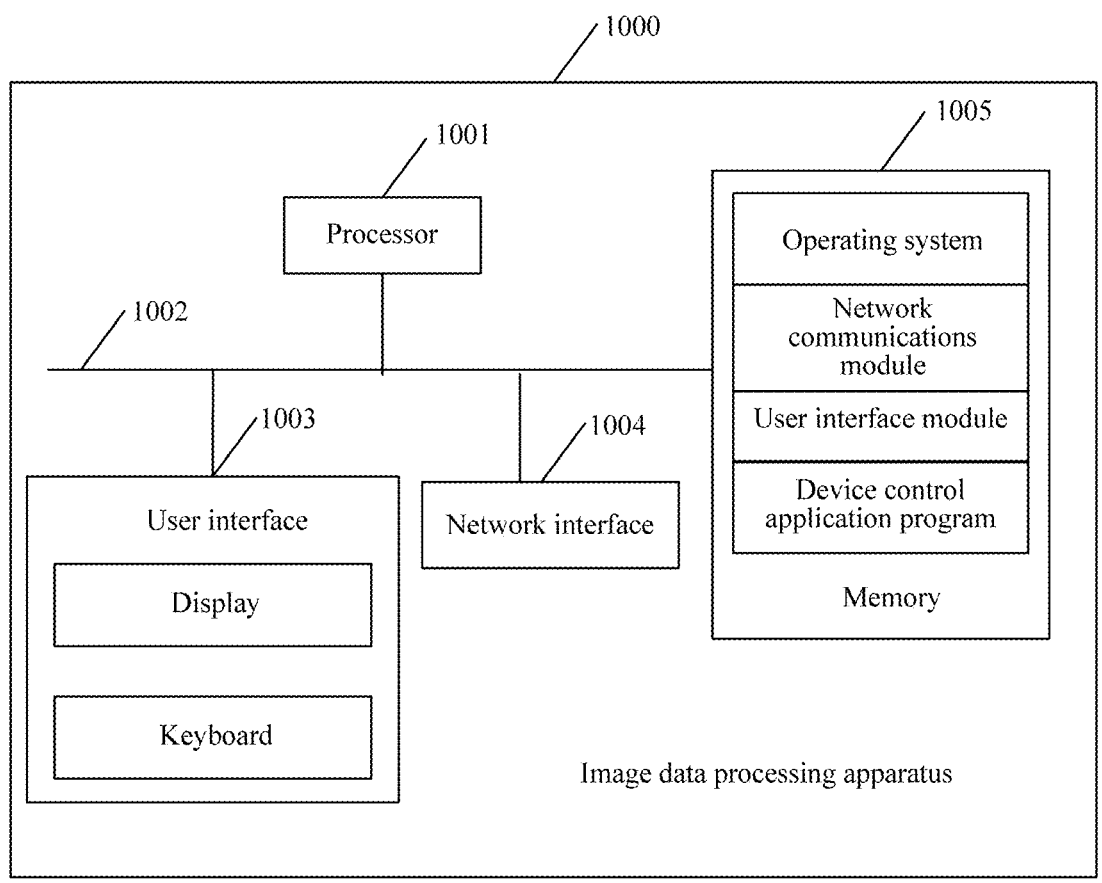
FIG. 16 is a schematic structural diagram of still another image data processing apparatus according to an embodiment of the present disclosure.

Further, referring to FIG. 16, FIG. 16 is a schematic structural diagram of still another image data processing apparatus according to an embodiment of the present disclosure. As shown in FIG. 16, the image data processing apparatus 1000 may be applied to the host terminal in the embodiment corresponding to the foregoing FIG. 1. The image data processing apparatus 1000 may include: at least one processor 1001, for example, a CPU, at least one network interface 1004, a user interface 1003, a memory 1005, and at least one communications bus 1002. The communications bus 1002 is configured to implement connection and communication between the components. The user interface 1003 may include a display, a keyboard, and optionally, the user interface 1003 may further include a standard wired interface and a standard wireless interface. Optionally, the network interface 1004 may include a standard wired interface and a standard wireless interface (such as a Wi-Fi interface). The memory 1005 may be a high-speed RAM memory, or may be a non-volatile memory, for example, at least one magnetic disk memory. Optionally, the memory 1005 may further be at least one storage apparatus that is located far away from the processor 1001. As shown in FIG. 16, the memory 1005, which is used as a computer storage medium, may include an operating system, a network communications module, a user interface module, and a device control application program.

In the image data processing apparatus 1000 shown in FIG. 16, the network interface 1004 is mainly configured to connect a name server and a service server cluster. The user interface 1003 is mainly configured to provide an input interface for a user. The processor 1001 may be configured to invoke the device control application program, stored in the memory 1005, to implement:

obtaining target image data, and creating grid information on a target display region corresponding to the target image data, the grid information including a plurality of subgrids, and each subgrid being corresponding to a different grid number;

obtaining a sliding operation track corresponding to a touch screen, and extracting a touch point that is in the sliding operation track and that is located on the target display region, as a target touch point;

creating position coordinates of the target touch point according to the grid information, and calculating, according to the grid information and the position coordinates of the target touch point, a cleaning number corresponding to the target touch point;

adding a grid number same as the cleaning number to a preset number set, and deleting subimage data covered by the target touch point; and completely deleting, when the quantity of grid numbers in the number set meets a preset cleaning condition, the target image data from which a plurality of pieces of subimage data has been deleted.

In an embodiment, when performing the obtaining target image data, and creating grid information on a target display region corresponding to the target image data, the processor 1001 specifically performs the following steps:

obtaining target image data, and covering the target image data on an original display interface for display;

obtaining a maximum length and a maximum width covered on the original display interface by the target image data, and determining, based on the maximum length and the maximum width, a target display region corresponding to the target image data, the target image data being located in the target display region;

creating an initial table in the target display region, and determining each minimum unit rectangular box in the initial table as a subgrid, the initial table completely overlapping the target display region, both a spacing between every two neighboring horizontal lines in the initial table and a spacing between every two neighboring vertical lines being a default touch point diameter, and both the length and the width of each subgrid being the default touch point diameter; and separately configuring a corresponding grid number for each subgrid, and determining an initial table including the grid number as grid information.

In an embodiment, after performing the completely deleting target image data from which a plurality of pieces of subimage data has been deleted, the processor 1001 further performs the following step:

displaying the original display interface.

In an embodiment, before performing the completely deleting, when the quantity of grid numbers in the number set meets a preset cleaning condition, the target image data from which a plurality of pieces of subimage data has been deleted, and displaying an original display interface, the processor 1001 further performs the following steps:

accumulating the quantity of grid numbers in the number set, as a target quantity, and obtaining a total quantity of subgrids in the grid information;

dividing the total quantity of the subgrids by the target quantity, to obtain a first value, and multiplying the first value with a preset first area proportion, to obtain a second value, the first area proportion being the ratio of the area of a touch point to the area of a subgrid;

determining whether the second value is less than a cleaning threshold;

determining that the quantity of the grid numbers in the number set meets the preset cleaning condition, if determining that the second value is greater than or equal to the cleaning threshold; and determining that the quantity of the grid numbers in the number set does not meet the preset cleaning condition, if determining that the second value is less than the cleaning threshold the total quantity of the subgrids being the product of a total quantity of rows and a total quantity of columns in the grid information.

In an embodiment, when performing the dividing the total quantity of the subgrids by the target quantity, to obtain a first value, and multiplying the first value with an area proportion parameter, to obtain a second value, the processor 1001 specifically performs the following steps:

obtaining a second area proportion between an image non-overlapping region and the target display region, the image non-overlapping region being a non-overlapping region between an image region corresponding to the target image data and the target display region; and dividing the total quantity of the subgrids by the target quantity, to obtain a first value, and multiplying the first value with the preset first area proportion and adding the product to the second area proportion, to obtain a second value.

In an embodiment, when performing the creating position coordinates of the target touch point according to the grid information, and calculating, according to the grid information and the position coordinates of the target touch point, a cleaning number corresponding to the target touch point, the processor 1001 specifically performs the following steps:

creating a rectangular coordinate system in the grid information, and calculating position coordinates of the target touch point according to the rectangular coordinate system; and obtaining a total quantity of columns in the grid information, and calculating, according to a preset grid number formula, the total quantity of columns, the default touch point diameter, and the position coordinates of the target touch point, the cleaning number corresponding to the target touch point.

In an embodiment, the preset grid number formula is $N=(\lfloor y/r \rfloor)*C+(\lfloor x/r \rfloor)$.

N is the cleaning number, x represents a horizontal coordinate value in the position coordinates, y represents a vertical coordinate value in the position coordinates, r is the default touch point diameter, and C represents the total quantity of columns in the grid information.

In an embodiment, when performing the adding a grid number same as the cleaning number to a preset number set, and deleting subimage data covered by the target touch point, the processor 1001 specifically performs the following steps:

detecting whether a grid number same as the cleaning number exists in the preset number set;

adding the grid number same as the cleaning number to the number set if the grid number same as the cleaning number does not exist in the number set, and deleting the subimage data covered by the target touch point.

skipping adding the grid number same as the cleaning number to the number set if the grid number same as the cleaning number exists in the number set, and deleting the subimage data covered by the target touch point.

In an embodiment, after performing the adding a grid number same as the cleaning number to a preset number set, and deleting subimage data covered by the target touch point, the processor 1001 specifically performs the following steps:

displaying target image data from which subimage data covered by the target touch point has been deleted, and uploading, to a server, a deletion instruction carrying the subimage data covered by the target touch point, so that the server notifies, according to the deletion instruction, terminal devices in a plurality of terminal devices to synchronously delete the subimage data covered by the target touch point.

In an embodiment, after performing the completely deleting, when the quantity of grid numbers in the number set meets a preset cleaning condition, the target image data from which a plurality of pieces of subimage data has been deleted, and displaying an original display interface, the processor 1001 further performs the following step:

sending a complete deletion instruction to the server, so that the server notifies, according to the complete deletion instruction, the terminal devices to synchronously delete the target image data from which the plurality of pieces of subimage data has been deleted, and synchronously displaying the original display interface.

In the embodiments of the present disclosure, the data image processing apparatus 1000 first obtains target image data, and creates grid information on a target display region corresponding to the target image data, the grid information including a plurality of subgrids, and each subgrid corresponding to a different grid number; second, obtains a sliding operation track corresponding to a touch screen, and extracts a touch point that in the sliding operation track and that is located on the target display region as a target touch point; then, creates position coordinates of the target touch point according to the grid information, and calculates, according to the grid information and the position coordinates of the target touch point, a cleaning number corresponding to the target touch point; then, adds a grid number same as the cleaning number to a preset number set, and deletes subimage data covered by the target touch point; and finally, completely deletes, when the quantity of grid numbers in the number set meets a preset cleaning condition, the target image data from which a plurality of pieces of subimage data has been deleted. As can be seen, when deleting the subimage data covered by the target touch point, the image data processing apparatus 1000 does not need calculate the area of an actually deleted figure in real time, but may only need completely delete, when the quantity of grid numbers added to the number set meets the preset cleaning condition, the target image data from which the plurality of pieces of subimage data has been deleted, thereby further improving the calculation efficiency for target image data corresponding to an irregular figure, and reducing calculation errors for a cleaning proportion.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may be: a magnetic disk, an optical disc, a read-only memory (ROM), a random access memory (RAM), or the like.

What is disclosed above is merely an example of the embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. An image data processing method performed at a computing device having one or more processors and memory storing a plurality of programs to be executed by the one or more processors, comprising:
   obtaining target image data;
   creating grid information on a target display region corresponding to the target image data, the grid information comprising a plurality of subgrids, and each subgrid being corresponding to a different grid number;
   obtaining a sliding operation track corresponding to a touch screen;
   extracting a touch point that is in the sliding operation track and that is located on the target display region, as a target touch point;
   creating position coordinates of the target touch point according to the grid information;
   calculating, according to the grid information and the position coordinates of the target touch point, a cleaning number corresponding to the target touch point;
   adding a grid number same as the cleaning number to a preset number set, further including:
      detecting whether the grid number exists in the preset number set;
      adding the grid number to the preset number set if the grid number not exist in the preset number set; and
      skipping adding the grid number to the preset number set if the grid number exists in the preset number set;
   deleting subimage data covered by the target touch point; and
   completely deleting, when the quantity of grid numbers in the preset number set meets a preset cleaning condition, the target image data from which a plurality of pieces of subimage data has been deleted.

2. The method according to claim 1, wherein the operation of obtaining the target image data, and creating grid information on the target display region corresponding to the target image data comprises:
   obtaining a target image data, and covering the target image data on an original display interface for display;
   obtaining a maximum length and a maximum width covered on the original display interface by the target image data, and determining, based on the maximum length and the maximum width, a target display region corresponding to the target image data, the target image data being located in the target display region;
   creating an initial table in the target display region, and determining each minimum unit rectangular box in the initial table as a subgrid, the initial table completely overlapping the target display region, both a spacing between every two neighboring horizontal lines in the initial table and a spacing between every two neighboring vertical lines being a default touch point diameter, and both the length and the width of each subgrid being the default touch point diameter; and
   separately configuring a corresponding grid number for each subgrid, and determining an initial table comprising the grid number as grid information.

3. The method according to claim 2, further comprising:
   after completely deleting target image data from which the plurality of pieces of subimage data has been deleted, displaying the original display interface.

4. The method according to claim 1, further comprising:
   before completely deleting, when the quantity of grid numbers in the number set meets the preset cleaning condition, the target image data from which the plurality of pieces of subimage data has been deleted:
   accumulating the quantity of grid numbers in the number set, as a target quantity, and obtaining a total quantity of subgrids in the grid information;
   dividing the total quantity of the subgrids by the target quantity, to obtain a first value, and multiplying the first value with a preset first area proportion, to obtain a second value, the first area proportion being the ratio of the area of a touch point to the area of a subgrid;
   determining whether the second value is less than a cleaning threshold;
   determining that the quantity of the grid numbers in the number set meets a preset cleaning condition, if determining that the second value is greater than or equal to the cleaning threshold; and
   determining that the quantity of the grid numbers in the number set does not meet the preset cleaning condition, if determining that the second value is less than the cleaning threshold,
   the total quantity of the subgrids being the product of a total quantity of rows and a total quantity of columns in the grid information.

5. The method according to claim 4, wherein the operation of dividing the total quantity of the subgrids by the target quantity, to obtain the first value, and multiplying the first value with the area proportion parameter, to obtain the second value further comprises:
   obtaining a second area proportion between an image non-overlapping region and the target display region, the image non-overlapping region being a non-overlapping region between an image region corresponding to the target image data and the target display region; and dividing the total quantity of the subgrids by the target quantity, to obtain a first value, and multiplying the first value with the preset first area proportion and adding the product to the second area proportion, to obtain a second value.

6. The method according to claim 2, wherein the operation of creating position coordinates of the target touch point according to the grid information, and calculating, according to the grid information and the position coordinates of the target touch point, the cleaning number corresponding to the target touch point further comprises:

creating a rectangular coordinate system in the grid information, and calculating position coordinates of the target touch point according to the rectangular coordinate system; and obtaining a total quantity of columns in the grid information, and calculating, according to a preset grid number formula, the total quantity of columns, the default touch point diameter, and the position coordinates of the target touch point, the cleaning number corresponding to the target touch point.

7. The method according to claim 6, wherein the preset grid number formula is $N=(\lfloor y/r \rfloor)*C+(\lfloor x/r \rfloor)$, N being the cleaning number, x representing a horizontal coordinate value in the position coordinates, y representing a vertical coordinate value in the position coordinates, r being the default touch point diameter, and C representing the total quantity of columns in the grid information.

8. The method according to claim 1, further comprising:

after adding the grid number same as the cleaning number to the preset number set, and deleting subimage data covered by the target touch point:

displaying target image data from which subimage data covered by the target touch point has been deleted; and uploading, to a server, a deletion instruction carrying the subimage data covered by the target touch point, wherein the server notifies, according to the deletion instruction, terminal devices in a plurality of terminal devices to synchronously delete the subimage data covered by the target touch point.

9. A computing device comprising memory and a processor, the memory storing a plurality of computer-readable instructions that, when executed by the processor, cause the computing device to perform the following steps:

obtaining target image data;

creating grid information on a target display region corresponding to the target image data, the grid information comprising a plurality of subgrids, and each subgrid being corresponding to a different grid number;

obtaining a sliding operation track corresponding to a touch screen;

extracting a touch point that is in the sliding operation track and that is located on the target display region, as a target touch point;

creating position coordinates of the target touch point according to the grid information;

calculating, according to the grid information and the position coordinates of the target touch point, a cleaning number corresponding to the target touch point;

adding a grid number same as the cleaning number to a preset number set, further including:

detecting whether the grid number exists in the preset number set;

adding the grid number to the preset number set if the grid number not exist in the preset number set; and skipping adding the grid number to the preset number set if the grid number exists in the preset number set;

deleting subimage data covered by the target touch point; and completely deleting, when the quantity of grid numbers in the number set meets a preset cleaning condition, the target image data from which a plurality of pieces of subimage data has been deleted.

10. The computing device according to claim 9, wherein the operation of obtaining a target image data, and creating grid information on a target display region corresponding to the target image data comprises:

obtaining target image data, and covering the target image data on an original display interface for display;

obtaining a maximum length and a maximum width covered on the original display interface by the target image data, and determining, based on the maximum length and the maximum width, a target display region corresponding to the target image data, the target image data being located in the target display region;

creating an initial table in the target display region, and determining each minimum unit rectangular box in the initial table as a subgrid, the initial table completely overlapping the target display region, both a spacing between every two neighboring horizontal lines in the initial table and a spacing between every two neighboring vertical lines being a default touch point diameter, and both the length and the width of each subgrid being the default touch point diameter; and separately configuring a corresponding grid number for each subgrid, and determining an initial table comprising the grid number as grid information.

11. The computing device according to claim 10, wherein the plurality of computer-readable instructions further comprise:

after completely deleting target image data from which the plurality of pieces of subimage data has been deleted, displaying the original display interface.

12. The computing device according to claim 9, wherein the plurality of computer-readable instructions further comprise:

before completely deleting, when the quantity of grid numbers in the number set meets a preset cleaning condition, the target image data from which a plurality of pieces of subimage data has been deleted:

accumulating the quantity of grid numbers in the number set, as a target quantity, and obtaining a total quantity of subgrids in the grid information;

dividing the total quantity of the subgrids by the target quantity, to obtain a first value, and multiplying the first value with a preset first area proportion, to obtain a second value, the first area proportion being the ratio of the area of a touch point to the area of a subgrid;

determining whether the second value is less than a cleaning threshold;

determining that the quantity of the grid numbers in the number set meets a preset cleaning condition, if determining that the second value is greater than or equal to the cleaning threshold; and determining that the quantity of the grid numbers in the number set does not meet the preset cleaning condition, if determining that the second value is less than the cleaning threshold, the total quantity of the subgrids being the product of a total quantity of rows and a total quantity of columns in the grid information.

13. The computing device according to claim 12, wherein the operation of dividing the total quantity of the subgrids by the target quantity, to obtain a first value, and multiplying the first value with an area proportion parameter, to obtain a second value further comprises:
obtaining a second area proportion between an image non-overlapping region and the target display region, the image non-overlapping region being a non-overlapping region between an image region corresponding to the target image data and the target display region; and
dividing the total quantity of the subgrids by the target quantity, to obtain a first value, and multiplying the first value with the preset first area proportion and adding the product to the second area proportion, to obtain a second value.

14. The computing device according to claim 10, wherein the operation of creating position coordinates of the target touch point according to the grid information, and calculating, according to the grid information and the position coordinates of the target touch point, a cleaning number corresponding to the target touch point further comprises:
creating a rectangular coordinate system in the grid information, and calculating position coordinates of the target touch point according to the rectangular coordinate system; and
obtaining a total quantity of columns in the grid information, and calculating, according to a preset grid number formula, the total quantity of columns, the default touch point diameter, and the position coordinates of the target touch point, the cleaning number corresponding to the target touch point.

15. The computing device according to claim 14, wherein the preset grid number formula is $N=(\equiv y/r\rfloor)*C+(\lfloor x/r\rfloor)$,
N being the cleaning number, x representing a horizontal coordinate value in the position coordinates, y representing a vertical coordinate value in the position coordinates, r being the default touch point diameter, and C representing the total quantity of columns in the grid information.

16. The computing device according to claim 9, wherein the plurality of computer-readable instructions further comprise:
after adding a grid number same as the cleaning number to a preset number set, and deleting subimage data covered by the target touch point:
displaying target image data from which subimage data covered by the target touch point has been deleted; and
uploading, to a server, a deletion instruction carrying the subimage data covered by the target touch point, wherein the server notifies, according to the deletion instruction, terminal devices in a plurality of terminal devices to synchronously delete the subimage data covered by the target touch point.

17. A non-volatile computer readable storage medium, storing a plurality of computer-readable instructions that, when executed by one or more processors of a computing device, cause the computing device to perform the following steps:
obtaining target image data;
creating grid information on a target display region corresponding to the target image data, the grid information comprising a plurality of subgrids, and each subgrid being corresponding to a different grid number;
obtaining a sliding operation track corresponding to a touch screen;
extracting a touch point that is in the sliding operation track and that is located on the target display region, as a target touch point;
creating position coordinates of the target touch point according to the grid information;
calculating, according to the grid information and the position coordinates of the target touch point, a cleaning number corresponding to the target touch point;
adding a grid number same as the cleaning number to a preset number set, further including:
detecting whether the grid number exists in the preset number set;
adding the grid number to the preset number set if the grid number not exist in the preset number set; and
skipping adding the grid number to the preset number set if the grid number exists in the preset number set;
deleting subimage data covered by the target touch point; and
completely deleting, when the quantity of grid numbers in the number set meets a preset cleaning condition, the target image data from which a plurality of pieces of subimage data has been deleted.

18. The non-volatile computer readable storage medium according to claim 17, wherein the operation of obtaining a target image data, and creating grid information on a target display region corresponding to the target image data comprises:
obtaining target image data, and covering the target image data on an original display interface for display;
obtaining a maximum length and a maximum width covered on the original display interface by the target image data, and determining, based on the maximum length and the maximum width, a target display region corresponding to the target image data, the target image data being located in the target display region;
creating an initial table in the target display region, and determining each minimum unit rectangular box in the initial table as a subgrid, the initial table completely overlapping the target display region, both a spacing between every two neighboring horizontal lines in the initial table and a spacing between every two neighboring vertical lines being a default touch point diameter, and both the length and the width of each subgrid being the default touch point diameter; and
separately configuring a corresponding grid number for each subgrid, and determining an initial table comprising the grid number as grid information.

19. The non-volatile computer readable storage medium according to claim 17, wherein the plurality of computer-readable instructions further comprise:
before completely deleting, when the quantity of grid numbers in the number set meets a preset cleaning condition, the target image data from which a plurality of pieces of subimage data has been deleted:
accumulating the quantity of grid numbers in the number set, as a target quantity, and obtaining a total quantity of subgrids in the grid information;
dividing the total quantity of the subgrids by the target quantity, to obtain a first value, and multiplying the first value with a preset first area proportion, to obtain a second value, the first area proportion being the ratio of the area of a touch point to the area of a subgrid;
determining whether the second value is less than a cleaning threshold;

determining that the quantity of the grid numbers in the number set meets a preset cleaning condition, if determining that the second value is greater than or equal to the cleaning threshold; and determining that the quantity of the grid numbers in the number set does not meet the preset cleaning condition, if determining that the second value is less than the cleaning threshold, the total quantity of the subgrids being the product of a total quantity of rows and a total quantity of columns in the grid information.

20. The non-volatile computer readable storage medium according to claim 17, wherein the plurality of computer-readable instructions further comprise:

after adding a grid number same as the cleaning number to a preset number set, and deleting subimage data covered by the target touch point:

displaying target image data from which subimage data covered by the target touch point has been deleted; and uploading, to a server, a deletion instruction carrying the subimage data covered by the target touch point, wherein the server notifies, according to the deletion instruction, terminal devices in a plurality of terminal devices to synchronously delete the subimage data covered by the target touch point.

* * * * *